US010538640B2

(12) United States Patent
Lee et al.

(10) Patent No.: US 10,538,640 B2
(45) Date of Patent: Jan. 21, 2020

(54) POLYMER FOAM AND METHOD FOR PREPARING THE SAME

(71) Applicants: LCY Chemical Corp., Kaohsiung (TW); Ohio State Innovation Foundation, Columbus, OH (US)

(72) Inventors: Ly James Lee, Columbus, OH (US); Dachao Li, Chesterbrook, PA (US); Ying-Chieh Yen, Irvine, CA (US); Dajiong Fu, Guangzhou (CN); Yuen-Yuen D Chiu, Sugar Land, TX (US); Chiang-Hsiang Lin, Tainan (TW)

(73) Assignees: LCY CHEMICAL CORP., Kaohsiung (TW); OHIO STATE INNOVATION FOUNDATION, Columbus, OH (US)

( * ) Notice: Subject to any disclaimer, the term of this patent is extended or adjusted under 35 U.S.C. 154(b) by 96 days.

(21) Appl. No.: 15/220,634

(22) Filed: Jul. 27, 2016

(65) Prior Publication Data

US 2017/0029589 A1 Feb. 2, 2017

Related U.S. Application Data

(60) Provisional application No. 62/197,630, filed on Jul. 28, 2015.

(51) Int. Cl.

| | |
|---|---|
| ***B29C 44/00*** | (2006.01) |
| ***B29C 44/42*** | (2006.01) |
| ***C08J 9/12*** | (2006.01) |
| ***B29B 11/06*** | (2006.01) |
| ***B29C 44/02*** | (2006.01) |
| ***B29C 44/34*** | (2006.01) |
| ***C08J 9/224*** | (2006.01) |
| *C08J 9/00* | (2006.01) |
| *B29K 105/04* | (2006.01) |
| *B29K 23/00* | (2006.01) |

(52) U.S. Cl.

CPC ............... *C08J 9/122* (2013.01); *B29B 11/06* (2013.01); *B29C 44/02* (2013.01); *B29C 44/3415* (2013.01); *B29C 44/3442* (2013.01); *C08J 9/224* (2013.01); *B29K 2023/12* (2013.01); *B29K 2105/04* (2013.01); *C08J 9/0071* (2013.01); *C08J 2201/02* (2013.01); *C08J 2203/06* (2013.01); *C08J 2203/08* (2013.01); *C08J 2205/044* (2013.01); *C08J 2300/22* (2013.01); *C08J 2323/12* (2013.01)

(58) Field of Classification Search

CPC ... B29C 44/3453; B29B 11/08; C08J 2323/12
See application file for complete search history.

(56) References Cited

FOREIGN PATENT DOCUMENTS

CN 104327373 A 2/2015

OTHER PUBLICATIONS

Bao et al. "Supercritical Carbon Dioxide Induced Foaming of Highly Oriented Isotactic Polyproylene," Industrial & Engineering Chemistry Research, 2011, 50, pp. 13387-13395 (Year: 2011).*
Huan et al., "Markedly improving mechanical properties for isotactic polypropylene with large-size spherulites by pressure-induced flow processing," Polymer, 54, (2013), pp. 1177-1183 (Year: 2013).*
Guo et al., Ind. Eng. Chem. Res. 2015, 54, p. 217-225. Published on Nov. 24, 2014. (Year: 2014).*
Spherizone brochure. LyondellBasell. (Year: 2019).*
Dachao Li et al., "Ultrasound-assisted-pressure-induced-flow leading to superior polymer/carbon nanotube composites and foams", Polymer, vol. 80, Dec. 2, 2015, pp. 237-244.
Dajiong Fu et al., "Supercritical CO2 foaming of pressure-induced-flow processed linear polypropylene", Materials & Design, vol. 93, Mar. 5, 2016, pp. 509-513.
"Basell introduces new PP resins to address broad spectrum of customer packaging applications", web site: http://yondellbasell.mediaroom.com/index.php?s=43&item=468 (accessed Feb. 14, 2019).
Product Information—Higran RS1684—New polyproplyene resin used in large thermoformed parts, 2007.

* cited by examiner

*Primary Examiner* — Kara B Boyle
(74) *Attorney, Agent, or Firm* — Bacon & Thomas, PLLC

(57) ABSTRACT

Polymer foam and a method for preparing the same are disclosed. In the present disclosure, the method sequentially comprises the following steps: providing a polymer body; performing a pressure-induced flow (PIF) process on the polymer body at a first predetermined temperature and a first predetermined pressure for a pressure holding time, to obtain a polymer sheet; and performing a foaming process on the polymer sheet by using a foaming agent at a second predetermined temperature and a second predetermined pressure for a saturation time, to obtain polymer foam.

20 Claims, 16 Drawing Sheets

POLYMER FOAM AND METHOD FOR PREPARING THE SAME

CROSS REFERENCE TO RELATED APPLICATION

This application claims the benefit of filing date of U.S. Provisional Application Ser. No. 62/197,630, entitled "Semi-crystalline Polymer Nanocomposite and Foam Structure and Method for Making the Same" filed Jul. 28, 2015 under 35 USC § 119(e)(1).

BACKGROUND

1. Field of the Invention

The present disclosure relates to a method for preparing polymer foam and, more particularly to a method for preparing polymer foam via a pressure-induced flow (PIF) process.

2. Description of Related Art

Polymer foam, especially polypropylene foam, has many industrial applications, and the global polymer foam market has witnessed a rapid growth in the past few years.

Polypropylene (PP), as one of the most widely used commercial polymers, has many desirable properties, such as high melting point, good plasticity, low density, excellent chemical resistance and food safety, and easy recycling. These outstanding properties as well as a low material cost have made PP more competitive in producing plastics and foam products than other thermoplastics in various industrial applications. However, like other commodity polymers, the low thermal stability and mechanical strength prevent PP from many engineering and structural applications. Furthermore, its low melt strength leads to cell rupture and low expansion ratio in the melt foaming process unless long-chain branching, polymer compounding, or chemical cross-linking are used to modify PP.

However, PP is very difficult to be foamed because of its low melt strength and high crystallinity. Many methods such as polymer blends, composites, and copolymerization have been used to achieve good expandable PP and PP foams. However, these methods face limited applications owning to the significant cost increase in materials and poor mechanical strength of foamed products in comparison with PP and other widely used foam materials such as polystyrene (PS).

Hence, it is desirable to provide a novel method for preparing polymer foam, especially PP foam, which can manufacture polymer foam in a promising and feasible way; and therefore, the obtained polymer foam can be successfully used in industrial applications.

SUMMARY

The object of the present disclosure is to provide a method for preparing polymer foam via a pressure-induced flow (PIF) process and a foaming process.

A further object of the present disclosure is to provide polymer foam prepared by the method of the present disclosure.

Additionally, another object of the present disclosure is to provide a method for preparing polymer sheet with a co-continuous structure via a PIF process.

In one aspect of the present disclosure, the method for preparing polymer foam comprises the following steps: providing a polymer body; performing a PIF process on the polymer body at a first predetermined temperature and a first predetermined pressure for a pressure holding time, to obtain a polymer sheet; and performing a foaming process on the polymer sheet by using a foaming agent at a second predetermined temperature and a second predetermined pressure for a saturation time, to obtain polymer foam.

In another aspect of the present disclosure, the method for preparing polymer sheet with a co-continuous structure comprises the following steps: providing a polymer composite containing polymer pellets and coating materials, and surfaces of the polymer pellets are coated with the coating materials; and performing a PIF process on the polymer composite at a first predetermined temperature and a first predetermined pressure for a pressure holding time, to obtain a polymer sheet with a co-continuous structure. In addition, when the obtained polymer sheet with the co-continuous structure is treated with a foaming process by using a foaming agent at a second predetermined temperature and a second predetermined pressure for a saturation time, polymer composite foam can be obtained.

In further aspect of the present disclosure, the obtained polymer foam comprises: a polymer body with plural cells formed therein, wherein the polymer foam has foam density in a range from 0.03 $g/cm^3$ to 0.25 $g/cm^3$; and the polymer foam has compressive strength in a range from 0.2 MPa to 0.7 MPa when compressive strain of the polymer foam is between 10% and 70%.

It is known that the unmodified polymer, especially neat polypropylene (PP), is very difficult to be foamed due to its low melt strength and high crystallinity. In the present disclosure, a novel method is provided, wherein polymer is foamed through the PIF process and the foaming process. By using the method of the present disclosure, the polymer can be but not limited to be foamed under less strict conditions (lower pressure with higher temperature), and short pressure saturation time to obtain low-density polymer foam with high performance. Hence, compared to the conventional process for preparing the polymer foam, the pressure and the time held in the methods of the present disclosure can be reduced; therefore, the method of the present disclosure is more suitable for producing polymer foam in industrial applications.

In addition, when the polymer composite containing polymer pellets and coating materials coated thereon are treated with the PIF process and selectively treated with the foaming process, the obtained polymer sheet with the co-continuous structure or the foam structure can show superior mechanical and physical properties to conventional composites and foams made by the same composition.

Furthermore, compared to the conventional polymer foam prepared without the PIF process, the polymer foam of the present disclosure has low foam density as well as high strength. Hence, the polymer foam prepared with the method of the present disclosure can further be applied to various industrial applications.

In the polymer foam and the methods of the present disclosure, the polymer body can simply be made of polymer, or the polymer body may be a polymer composite containing polymer pellets and coating layers covering surfaces of the polymer pellets. In the case that the polymer body used in the methods of the present disclosure is the aforementioned polymer composite, the polymer composite can be prepared by the following steps: providing and mixing the polymer pellets and coating materials to obtain a mixture; and heating the mixture to obtain the polymer composite, wherein the polymer composite comprises the polymer pellets and the coating layer formed by the coating materials. After heating the mixture, the obtained polymer composite has a honeycomb-like structure.

Herein, the polymer pellets and the coating materials can be mixed at a temperature in a range from 140° C. to 160° C. To help mixing, a grinding agent such as zirconia toughened alumina may be added, so that mixing will be more uniform and thorough. Additionally, the mixture can be heated at a temperature in a range from 100° C. to 300° C.; and the mixture can be heated at a pressure in a range from 11.7 MPa to 17.3 MPa. Herein, the used heating means can be hot gas, electric heating, infrared or microwave. Furthermore, the obtained polymer composite can further be sieved through a sieve to remove the grinding agent and leftover coating materials.

Furthermore, the thickness of the coating layers on the polymer pellets are not particularly limited, and can be approximately in the range from 1 μm to 1000 μm. In addition, the coating layers can be totally or partially embedded inside of the surfaces of the pellets, or can be attached on the surfaces of the pellets, depending upon the process, the temperature and/or the pressure for coating the polymer pellets with the coating materials.

In the methods of the present disclosure, the polymer body may be selectively pre-pressed into a flat sheet, film shape, or other shapes at a temperature higher than room temperature (for example, 210° C.) and a predetermined pressure (for example, 1700 psi). However, this step is not necessary in the method of the present disclosure, and the polymer body can be treated with the PIF process directly without performing this pre-pressing process.

In the methods of the present disclosure, the first determined temperature held in the PIF process depends upon the type of the polymer body, and is preferably lower than a melting point of the polymer body. Preferably, the first predetermined temperature is in a range from 100° C. to 160° C. More preferably, the first predetermined temperature is in a range from 110° C. to 150° C. Most preferably, the aforesaid first predetermined temperature is suitable for the PIF process when the polymer body is made of PP.

In the methods of the present disclosure, the first predetermined pressure held in the PIF process may be in a range from 20 MPa to 420 MPa. Preferably, the first predetermined pressure is in a range from 20 MPa to 200 MPa. Most preferably, the first predetermined pressure is in a range from 20 MPa to 50 MPa. When the PIF process used in the methods of the present disclosure is an ultrasound assisted PIF process, the first predetermined pressure can further be reduced.

During the PIF process, a pressure holding time is not particularly limited, as long as the polymer body can be deformed. Preferably, the pressure holding time is in a range from 10 s to 300 s. More preferably, the pressure holding time is in a range from 10 s to 30 s.

In the methods of the present disclosure, after the aforementioned PIF process, the crystal domain of the polymer body can be turned into a co-continuous, "brick and mud" like structure.

In the methods of the present disclosure, the second predetermined temperature held in the foaming process may be in a range from 120° C. to 180° C. Preferably, the second predetermined temperature is in a range from 130° C. to 160° C. Most preferably, the second predetermined temperature is in a range from 140 to 155° C.

In the methods of the present disclosure, the second predetermined pressure held in the foaming process may be in a range from 11 MPa to 20 MPa. Preferably, the second predetermined pressure is in a range from 11.7 MPa to 17.3 MPa. Most preferably, the second predetermined pressure is in a range from 13.8 MPa to 17.2 MPa.

During the foaming process, a saturation time is not particularly limited, as long as the polymer sheet can be well foamed. The saturation time may be differed on the basis of the thickness of the polymer sheet. In the present disclosure, preferably, the saturation time is in a range from 10 min to 2 hr.

In the methods of the present disclosure, during the foaming process, the foaming agent used is not particularly limited, and can be any gas material or material capable of releasing gas. Examples of the foaming agent include, but are not limited to pentane, isopentane, cyclopentane, $CO_2$, $N_2$, a nitrogen-based material or a combination thereof. Preferably, the foaming agent suitable for the method of the present disclosure is $CO_2$. Most preferably, the foaming agent is supercritical $CO_2$.

Herein, the foaming agent can be introduced into a reactor for the foaming process, or introduced into the polymer body in a separate device such as extruder or kneader before performing the PIF or foaming process.

In the polymer foam of the present disclosure, the polymer foam may have foam density in a range from 0.03 g/cm$^3$ to 0.25 g/cm$^3$. Preferably, the foam density is in a range from 0.04 g/cm$^3$ to 0.10 g/cm$^3$. Therefore, the polymer foam obtained in the present disclosure is low-density polymer foam.

In the polymer foam of the present disclosure, an absolute value of a dimension change of the polymer foam may be between 0% to 60%, and preferably is between 0% and 40% when the polymer foam is placed in a condition of 120° C.

In the polymer foam of the present disclosure, the polymer foam can have a crystallinity ranging from 10% to 30%. Preferably the crystallinity of the polymer foam is between 15% and 25%.

In the polymer foam of the present disclosure, the cells may have average cell sizes ranging from 200 μm to 300 μm. Preferably, the average cell sizes of the cells are in a range from 240 μm to 260 μm.

In the polymer foam and the methods of the present disclosure, the types of the polymer body or the polymer pellets are not particularly limited, and can be semi-crystalline thermoplastics or thermoplastic elastomers. Examples of the semi-crystalline thermoplastics or thermoplastic elastomers can be polyolefins, which may include, but are not limited to, at least one selected from the group consisting of polyethylene, polypropylene (including a homopolymer, a block copolymer or a random copolymer), polyvinyl chloride, polycarbonates, polyamides, polyethylene terephthalate, polybutylene terephthalate, and polylactic acid. Examples of the thermoplastic elastomers include, but are not limited to polyolefin blends, elastomeric alloys (TPE-v or TPV) and thermoplastic polyamides. In addition, the shape and size of polymer pellets are not limited. In the methods of the present disclosure, preferably, the polymer body is unmodified polymer. More preferably, the polymer body or the polymer pellets comprises neat PP. The term neat PP means PP without modification.

In addition, the coating material of the polymer composite can be an organic substance, an inorganic substance or a combination thereof. Examples of the organic substance include, but are not limited to at least one selected from the group consisting of carbon nanoparticles, carbon microparticles, graphene, graphene oxide, carbon black, carbon nanofibers, carbon nanotubes and graphite. Examples of the inorganic substance include, but are not limited to at least one selected from the group consisting of clay, mica, glass fibers, silicates, metal particles, $SiO_2$, MgO, CaO, talc, $TiO_2$, ZnO and MnO.

Other objects, advantages, and novel features of the invention will become more apparent from the following detailed description when taken in conjunction with the accompanying drawings.

DETAILED DESCRIPTION OF THE PREFERRED EMBODIMENT

The present disclosure has been described in an illustrative manner, and it is to be understood that the terminology used is intended to be in the nature of description rather than of limitation. Many modifications and variations of the present disclosure are possible in light of the above teachings. Therefore, it is to be understood that within the scope of the appended claims, the invention may be practiced otherwise than as specifically described.

Figure 1A:
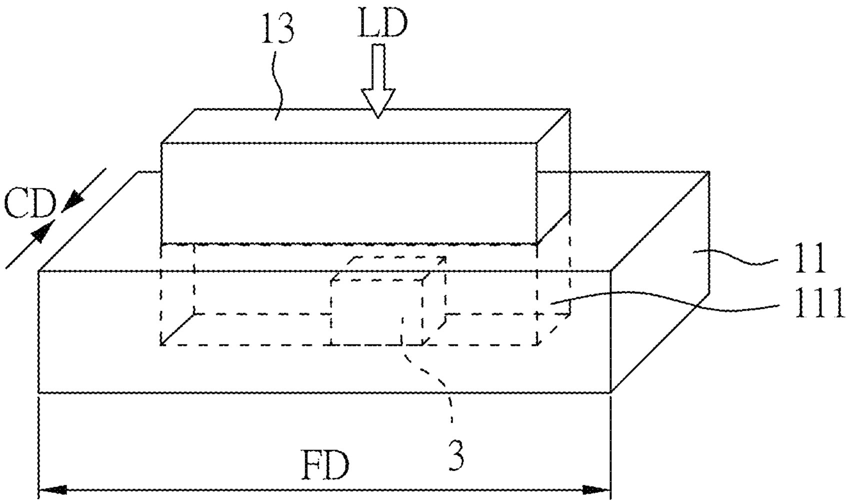
FIG. 1A is a perspective view showing a PIF apparatus used in examples of the present disclosure.
Figure 1B:
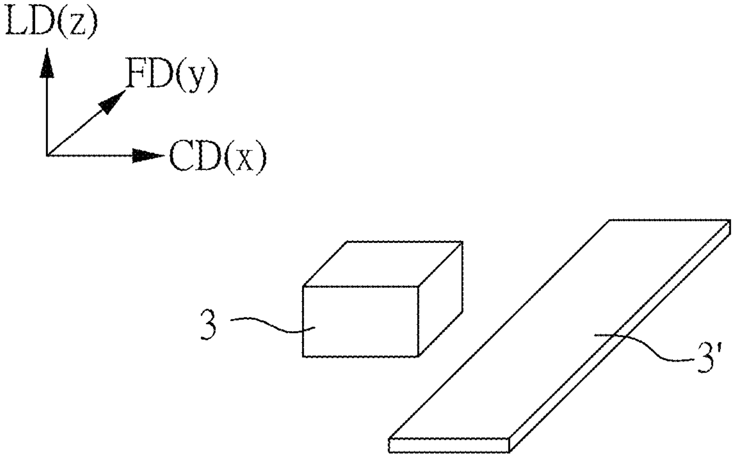
FIG. 1B is a perspective view showing PP samples before and after a PIF process.

FIG. 1A is a perspective view showing a PIF apparatus used in the present disclosure. The PIF apparatus used in the present disclosure mainly comprises: a channel mold 11 with a cavity 111; and a plunger 13 having a size approximately identical to the size of the cavity 111. During the PIF process, the sample 3 was placed in the cavity 111, followed by heated and pressed by the plunger 13; and then, the sample 3 was deformed, flowed in the flow direction (FD), constrained in the constraint direction (CD) and compressed in the load direction (LD). FIG. 1B is a perspective view showing samples before and after the PIF process. The sample 3 before the PIF process has a cube shape; but the present disclosure is not limited thereto. After the PIF process, the sample 3 is pressed and become a sheet 3'.

In the following examples, the cavity 111 has a size of 100×12×12 mm; but the present disclosure is not limited thereto.

Example 1—Preparation of Polymer Foam with Only PP

Characterization

Foam density: The mass densities of obtained PP samples $\rho_f$ were measured according to ASTM D792 involving weighing polymer foam in water using a sinker. $\rho_f$ was calculated as follows:

$$\rho_f = \frac{a}{a-b}\rho_{water}$$

where a is the apparent mass of specimen in air, b the apparent mass of specimen completely immersed in water.

Scanning electron microscopy (SEM): The morphologies of the obtained PP foams were studied by SEM (Philips XL30). The samples were immersed in liquid nitrogen for 30 min and then fractured. The fractured surfaces were sprayed with a layer of gold for further observation by SEM.

Thermal mechanical analysis (TMA): The thermal stability of PIF and foamed samples were investigated by using a TMA (TA Instruments TMA 2940). The dimension change of samples was measured at a scanning rate of 5° C./min from 30° C. to 180° C. under penetration mode.

Differential Scanning Calorimetry (DSC): The TA Q200 DSC was used to characterize the melting behavior of the PP foams with and without PIF processing. The scanning range was from 20 to 200° C. at a rate of 10° C./min. Samples were cut into 6-10 mg thin slices for DSC characterization.

X-ray Diffraction (XRD): The crystalline structure was investigated with an X-ray diffractometer (Bruker D8 Advance XRD) which has a Cu-kα radiation source and a wavelength of X-ray 1.54 Å. The samples were scanned by 4°/min from 5° to 45° under 40 V and 50 mA.

Compressive test: Compressive strength of foams was conducted on an Instron 5569 Advanced Materials Testing system at room temperature according to standard ASTM D695.

Experiments

The Effect of PP and PIF Conditions on Foam Density

Figure 2A:
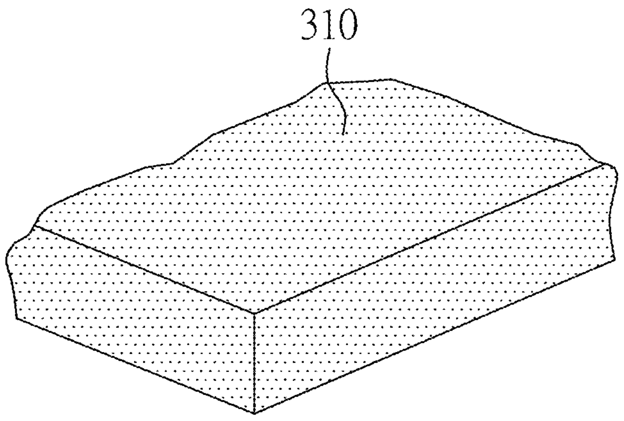
FIG. 2A is a perspective view showing a part of a PP sample after a PIF process according to Example 1 of the present disclosure.

Herein, several types of PP with different melt flow index (MFI) listed in the following Table 1 were used. The PP samples of size 50 mm (length)×12 mm (width)×2 mm (height) were placed in the PIF apparatus as shown in FIG. 1A, and deformed at various temperatures, various pressure and various pressure holding time listed in the following Table 1. FIG. 2A is a perspective view showing a part of the PP sample 310 after the PIF process.

Figure 2B:
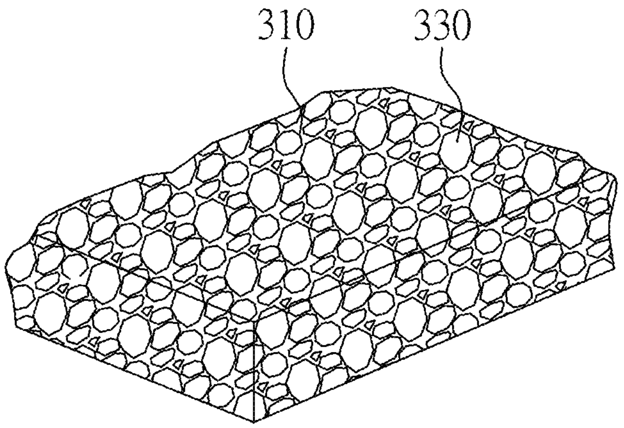
FIG. 2B is a perspective view showing a part of a PP foam after a foaming process according to Example 1 of the present disclosure.

After the PIF process, the obtained samples were placed in the high pressure vessel and then $scCO_2$ with a purity of 99.99% was injected into the vessel. After the samples were saturated at certain temperature and pressure for a certain period of time, an instant depressurization was applied to achieve PP foaming. FIG. 2B is a perspective view showing a part of the PP sample 310 after the foaming process. As shown in FIG. 2B, after the foaming process, cells 330 are formed in the PP sample 310.

In the present example, the foam densities of the obtained PP samples were detected and the results are summaries in the following Table 1.

TABLE 1

| PP | Melt flow index (g/10 min) | $T_m$ (° C.) | Crystallinity (%) | PIF conditions | Foam density (g/cm³) |
|---|---|---|---|---|---|
| PP1 | 3 | 169 | 37 | 150° C., 34.5 MPa, 5 min | 0.052 |
| Dow PP | 2 | 166 | 37.5 | 150° C., 34.5 MPa, 5 min | 0.091 |
| PP2 | 1.6 | 168 | 37 | 150° C., 34.5 MPa, 5 min | 0.062 |
| PP3 | 14.5 | | 35 | 150° C., 34.5 MPa, 5 min | 0.18 |
| PP4 | 55 | 165 | 42 | 150° C., 34.5 MPa, 5 min | 0.21 |
| HMSPP | 2.1 | 163 | 35 | Without PIF | 0.025 |
| PP fiber | N/A | 147 | 17 | Without PIF | 0.92 |
| BOPP | N/A | 164 | 32 | Without PIF | 0.93 |

Foaming conditions: 155° C., 13.8 MPa, 2 h;
N/A: not available.
PP1: Neat PP, PC366-3 (Homo) provided by LCY Chemical Corp.
PP2: Neat PP, PT100 (Homo) provided by LCY Chemical Corp.
PP3: Neat PP, 6331 provided by LCY Chemical Corp.
PP4: Neat PP, HP600S provided by LCY Chemical Corp.
Dow PP: H349-02 provided by Dow Chemical Co.

Figure 8:
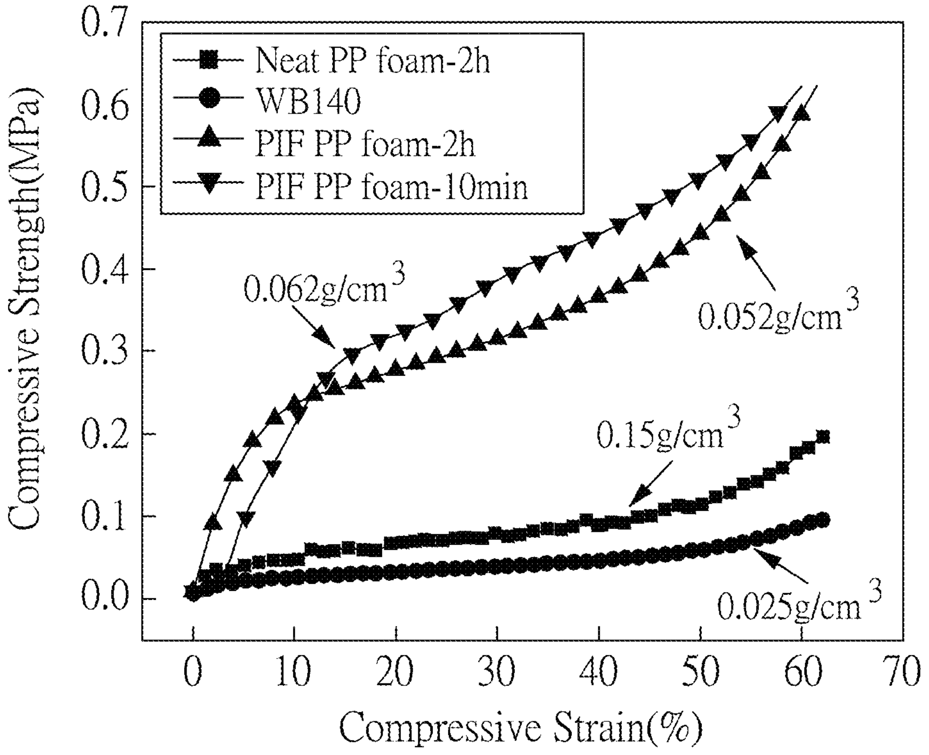
FIG. 8 is a diagram showing compressive behavior of various foams according to Example 1 of the present disclosure.
Figure 9:
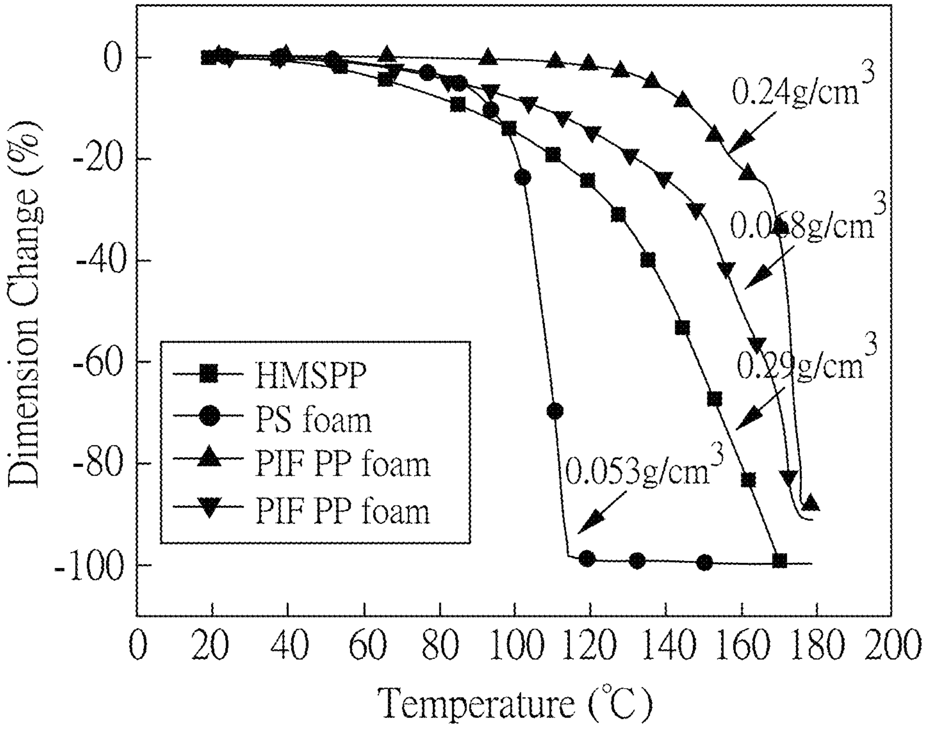
FIG. 9 is a diagram showing thermal stability of various foams according to Example 1 of the present disclosure.

As shown in Table 1, it could be seen that PP with a low MFI showed better foamability. As the MFI increased, which meant lower melt strength, PP could still be foamed, but the foam density increased. A commercially available high melt strength PP (HMSPP) (WB140 from *Borealis*) was also used for comparison. It could be foamed nicely without PIF, but the foam strength and thermal stability were poor, as shown in FIGS. 8 and 9.

PP objects which were oriented to have a “shish-kebabs” structure such as PP fibers and biaxially oriented PP (BOPP) films were also foamed to compare with PIF PP. The results in Table 1 showed that PP fibers and BOPP could not be foamed, which meant that the oriented crystal structure alone was not sufficient for PP foaming. Clearly, an elongated “brick and mud” like crystal structure formed by PIF is essential to achieve PP foaming.

To realize PIF, the temperature has to be under melting point of PP, so PP remains in a solid state during the whole PIF process. As the amorphous regions of PP deform along the perpendicular direction of exerted pressure axially under a desired pressure and temperature to elongate the PP spherulite crystal domains, there is a compromise between the applied temperature and pressure. At a lower temperature, a higher pressure is needed; while a lower pressure could be sufficient if employing a higher temperature.

Hereinafter, PP1 listed in Table 1 was selected for further optimization of the PIF and foaming process. The PIF conditions are listed in the following Table 2, the aforementioned foaming process was performed, and the foaming condition remained the same at 13.8 MPa and 155° C. for 2 h.

TABLE 2

| PIF conditions | PIF Time | Foam density (g/cm³) |
|---|---|---|
| 110° C., 414 MPa | 300 s | 0.043 |
| 110° C., 414 MPa | 10 s | 0.073 |
| 150° C., 34.5 MPa | 300 s | 0.052 |
| 150° C., 34.5 MPa | 10 s | 0.094 |

Figure 3:
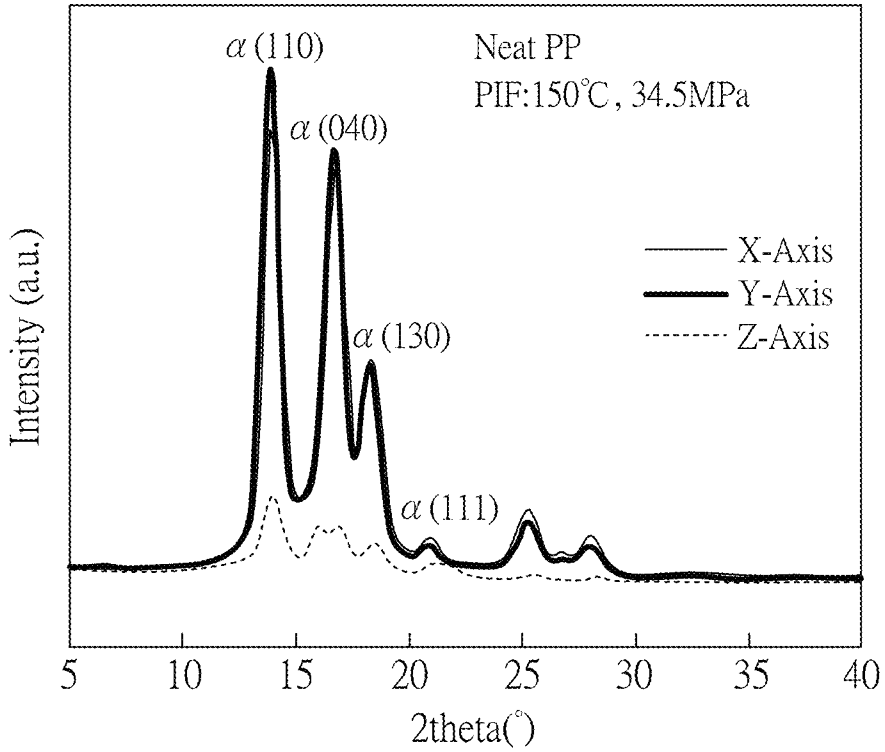
FIG. 3 is an XRD of PP sample treated with a PIF process under 150° C. and 34.5 MPa according to Example 1 of the present disclosure.

As shown in Table 2, the foamed samples treated with PIF process at 150° C. and 34.5 MPa have a density very close to that at 110° C. and 414 MPa. Also, the PIF pressure holding time tended to have little effect on foam density. This implies that much more industrially relevant PIF conditions, 34.5 instead of 414 MPa pressure and 10 instead of 300 s pressure holding time would be sufficient for achieving low-density PP foams. That is, the cycle time of PIF time could be much shortened. FIG. 3 is an XRD of PP sample treated with a PIF process under 150° C. and 34.5 MPa, and this result shows that a similar deformation of spherulites observed at 34.5 MPa and 150° C. to that at 414 MPa and 110° C.

The Effect of Foaming Pressure on Foam Density

In the foaming process, the foaming pressure is a critical factor. Different foaming pressures were used to investigate the effect on foam density. Hereinafter, PP1 listed in Table 1 was selected, the PIF conditions was 150° C., 34.5 MPa and 10 s, and the foaming conditions was 155° C., 2 h and different foaming pressures (8.3, 11.7, 13.1, 13.8, 15.5 and 17.2 MPa).

Figure 4:
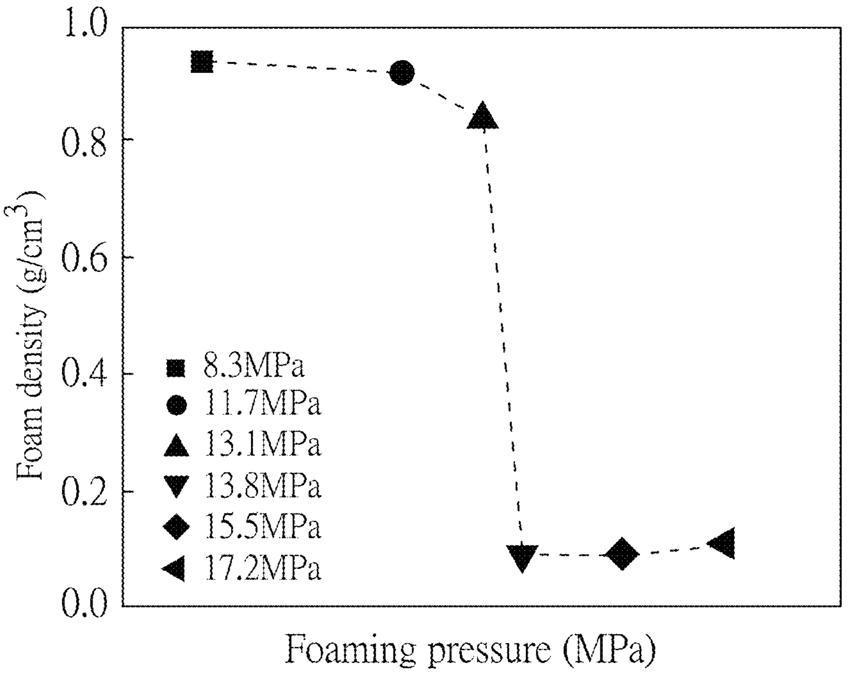
FIG. 4 shows a relation of foaming pressure vs. foam density according to Example 1 of the present disclosure.

As shown in FIG. 4, a sudden drop of foam density occurred at 13.8 MPa. When the pressure was lower than 13.8 MPa, the foam density was much higher. Above 13.8 MPa, foam density remained nearly constant as the pressure increased. Herein, crystallinity of foamed PP samples was also examined by DSC and the results are summarized in the following Table 3.

TABLE 3

| | Foaming pressure | | | | | |
|---|---|---|---|---|---|---|
| | 8.3 MPa | 11.7 MPa | 13.1 MPa | 13.8 MPa | 15.5 MPa | 17.3 MPa |
| Crystallinity | 44.8% | 48.9% | 40.68% | 16.3% | 20.75% | 22.36% |

As shown in Table 3, distinct change of crystallinity of foams can be found. Below 13.8 MPa, the crystallinity of PP foams remained similar and when pressure reached 13.8 MPa an apparent drop of crystallinity was observed. It is well known that the melting temperature would decrease as $CO_2$ saturation pressure increased. It is clear that when pressure was below 13.8 MPa, the melting temperature of PP decreased but was still higher than the foaming temperature of 155° C. Under this condition, the amorphous region for foaming remained small, so the foam density was high. However, when the $CO_2$ saturation pressure was 13.8 MPa or higher, the melting temperature became close to 155° C. and a great deal of crystals would melt to become the amorphous phase. A net result was a sudden decrease of the foam density when the $CO_2$ saturation pressure was released. Also a higher foaming pressure meant a higher pressure release rate and therefore more cell nucleation and growth during foaming.

Figure 5:
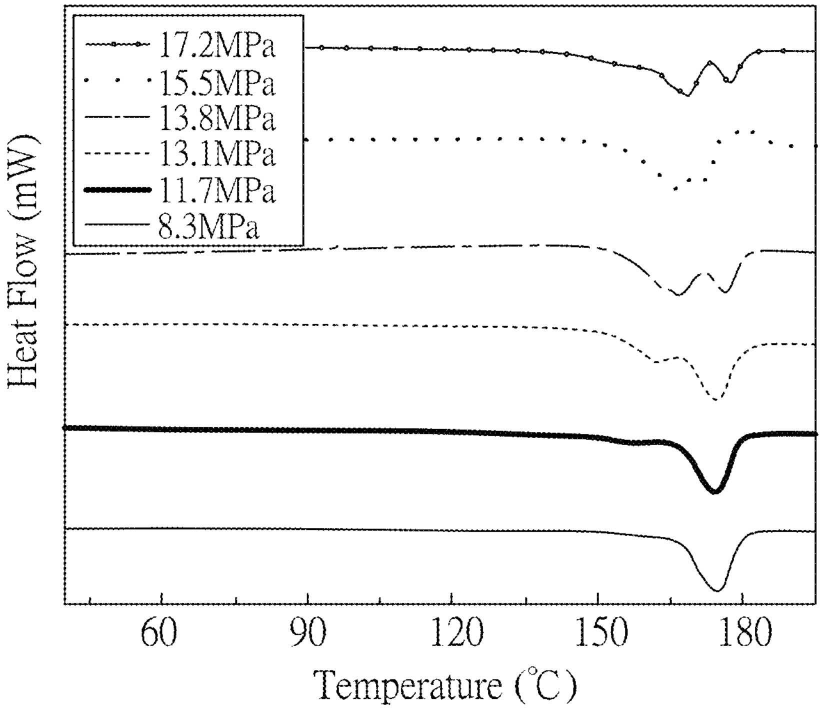
FIG. 5 is a diagram showing thermal property of PP foamed treated with different foaming pressures according to Example 1 of the present disclosure.

FIG. 5 is a diagram showing thermal property of PP foamed treated with different foaming pressures. From the results shown in FIG. 5, little change of crystal melting peaks was found when the $CO_2$ saturation pressure was below 13.8 MPa. As the $CO_2$ saturation pressure increased to and over the threshold of 13.8 MPa, a small shoulder melting peak occurred which meant that imperfect crystals melted and recrystallized during the isothermal $CO_2$ saturation process at 155° C. Those crystals that remained unmelted could be the perfected forms of $\alpha_1$ to $\alpha_2$ crystals which has higher melting temperatures that could survive the high $CO_2$ saturation pressure at 155° C. The remaining elongated "brick" like crystal structure was important for foaming of PP. The cooling process was very fast during the endothermic foaming process, consequently, the recrystallization and rearrangement of melted crystals and possibly some amorphous phases would occur which resulted in a slight increase of crystallinity at higher $CO_2$ saturation pressures as shown in Table 3.

The Effect of $CO_2$ Saturation Time on Foam Density

Figure 6:
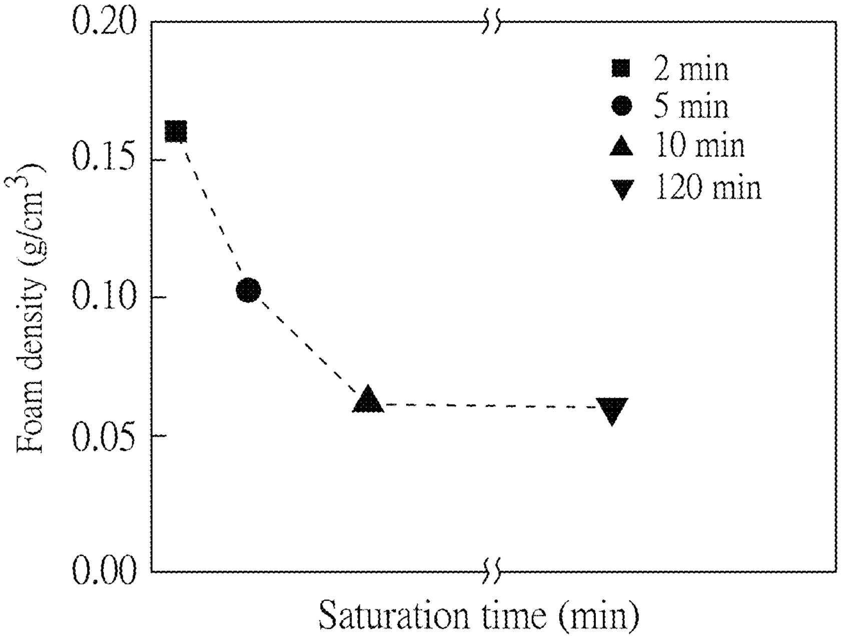
FIG. 6 is a diagram showing effect of $scCO_2$ saturation time on foam density according to Example 1 of the present disclosure.

During foaming, the $CO_2$ saturation time could affect the foam density. Since batch foaming is a time consuming process because of its typically long gas saturation time, to shorten the saturation time is very critical for industrial scale batch foaming manufacturing processes. The effect of different saturation times on foam density of PIF processed PP was studied and shown in FIG. 6, wherein the foaming condition was 155° C. and 13.8 MPa. As shown in FIG. 6, a longer saturation time corresponds to a lower foam density, which means a higher expansion ratio. However, for a given sample size, a plateau of the foam density was observed when the saturation time was longer than 10 min. This indicates that PIF processed PP has the ability to keep $CO_2$ and prevent $CO_2$ from escaping out the PP matrix fast when the pressure is released. This is beneficial to achieve low density foams under a shorter batch foaming cycle time.

The Morphology of PIF PP Foams

Figure 7A:
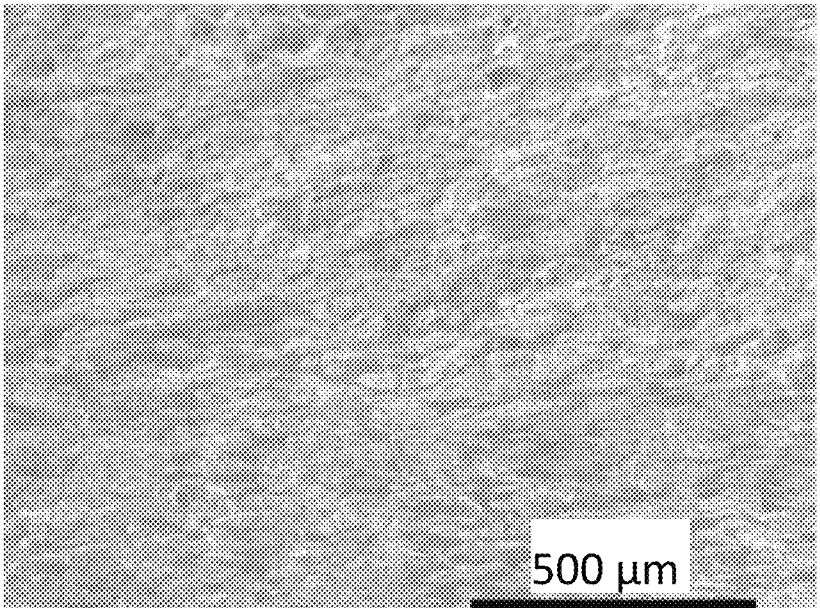
FIGS. 7A to 7C are SEM of PIF PP foam formed at different pressure and different saturation time according to Example 1 of the present disclosure.
Figure 7B:
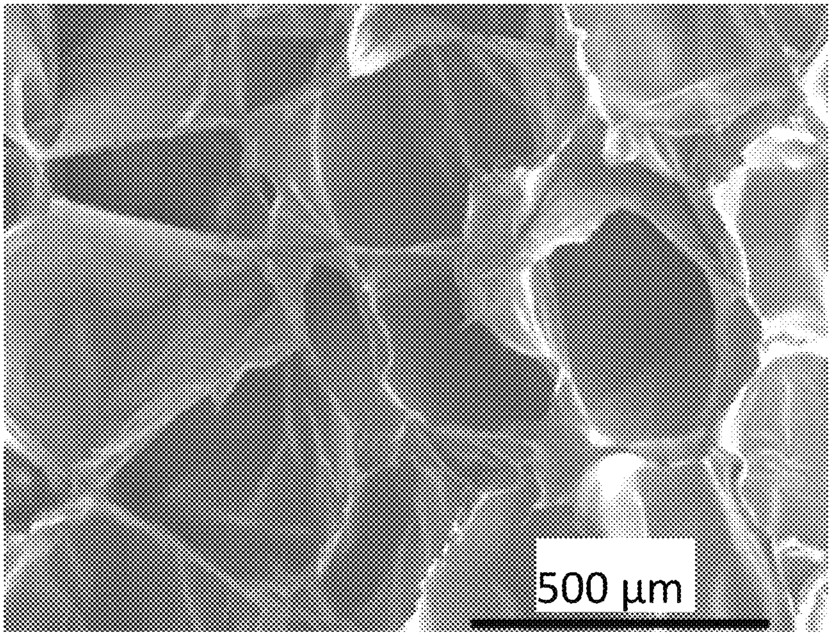
Figure 7C:
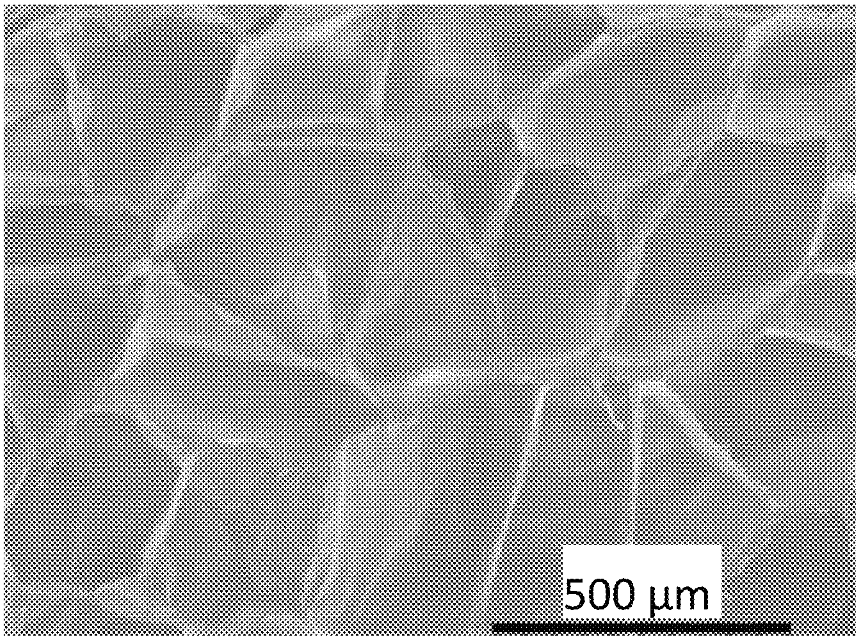

The morphology of PIF PP foams were observed by SEM, and the results are shown in FIGS. 7A to 7C. From the SEM results of the PIF PP foams foamed at pressure of 11.7 MPa for 2 h (as shown in FIG. 7A), only few small cells existed in the foam and foam density was high when the $CO_2$ saturation pressure was under the critical value of 13.8 MPa. When the $CO_2$ saturation pressure reached at the critical value of 13.8 MPa for 2 h, very low density foam with a cell density of $2.75\times10^6$ was obtained, as shown in FIG. 7B. Uniformly distributed cells with an average cell size of 261.5 μm were observed in the foam which was foamed at pressure of 13.8 MPa for 2 h. As shown in FIG. 7C, a shorter saturation time could achieve similar PP foam with a slightly higher cell density of $5.2\times10^6$ and a slightly smaller average cell size of 255 μm, from the SEM result of the PIF PP foams foamed at pressure of 13.8 MPa for 10 min.

Compressive Behavior of PP Foams

The compressive strength of foam is an important factor to be considered in practical applications. After the foaming process at 13.8 MPa and 155° C., the compressive behavior of PP foams was measured and the results are shown in FIG. 8. PIF PP foams under a saturation time of 2 h and 10 min were measured for comparison. PIF PP foams had a much higher compressive strength compared to neat PP foam and WB140 HMS PP. PIF foams under different saturation times had a similar compressive strength.

Thermal Stability of PIF PP Foams

Thermal stability is also one of the most important factors that determine potential applications of foams. The obtained TMA results can be seen in FIG. 9. To make a comparison, a high melt strength PP (HMSPP) foam used for coffee cups and a PS foam for thermal insulation were tested. It is obvious that PIF PP foams have a much better thermal stability and the foam would not collapse till temperature reached 100° C. or higher at a similar foam density. This indicates that PIF processed PP foams have a higher working temperature and better compressive strength that could satisfy many different working environments and has the potential to replace conventional EPP and PS foams, particularly for food container applications where chemical toxicity is a major concern.

From the results of the present example, PIF of PP could be processed under a low pressure of 34.5 MPa and a short holding pressure of 10 s. From XRD analysis, a deformation of spherulites was observed which indicated that oriented "brick and mud" structure was formed inside PP even at such mild PIF conditions. In addition, from the results of the present example, for foaming at 155° C., a critical $CO_2$ saturation pressure of 13.8 MPa was essential to achieve low-density PP foams. In addition, it was found that the $CO_2$ saturation time for PIF PP foaming could be greatly shortened from 2 h to 10 min for a sample with 2-mm thickness. PIF PP foams showed much higher compressive strength and better thermal stability than conventional PP foams. Therefore, PP foams can be prepared in a promising and feasible way by using the method of the present disclosure.

Example 2—Preparation of Polymer Foam with a Composite Comprising PP and MWCNT Characterization All the characterization methods used in the present example are similar to those illustrate in Example 1, and the differences are listed below.

SEM: The difference between Example 1 and present example is that the samples were immersed in liquid nitrogen for 10 min and then fractured in the present example.

DSC: The difference between Example 1 and present example is that samples were cut into 10-15 mg thin slices for DSC characterization in the present example.

XRD: The difference between Example 1 and present example is that the samples were scanned from 5° to 70° with an increment of 0.4°.

Polarizing microscopy: A Leitz 1720 Cryostat Microtome was utilized to prepare thin slices of PP sample. The PP samples were cooled down to −15° C., and then cut into 25 and 50 μm thin slices. The 25 μm slices were utilized to observe the crystal structure of PP sample before and after PIF under polarizing microscopy. While the 50 μm slices were observed by optical microscopy to determine the "brick and mud" structure.

Mechanical testing: All samples were made into appropriate sizes according to ASTM standards for mechanical testing. The flexural, tensile, and compression properties of samples were measured using an INSTRON 5569 advanced materials testing system at room temperature. The Izod impact strength of samples was measured using a TMI Izod impact tester at room temperature. The electrical resistance of samples was determined by a Keithley 6514 electrometer at room temperature.

Experiments

Linear PP H349-02 with melt flow index of 2.0 g/10 min was kindly provided by Dow Chemical Co., US. Its crystallinity and melting temperature were 37.62±0.02% and 164±0.85° C. in nitrogen at ambient pressure with 10° C./min scanning rate. The original size of this PP pellets was between 2-2.5 mm and they were grinded into smaller pellets with diameter no larger than 0.3 mm. In other examples of the present disclosure, the ground pellets can have diameter of 0.01 mm to 0.3 mm.

Multi-wall carbon nano-tube (MWCNT) of Graphistrength C100 with diameter 10-15 nm and tube length between 0.1-10 μm was purchased from GraphiSTRENGTH Advanced Materials.

Figure 10A:
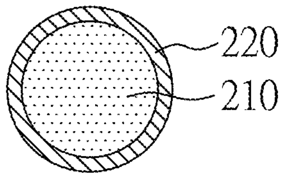
FIG. 10A is a perspective view showing a PP/MWCNT composite obtained in Example 2 of the present disclosure.

Ground PP pellets (60 g), MWCNT (0.6-2.0 g) and grinding media (150 g) were placed in a glass container (1000 ml) at 135° C. under mechanical mixing (300 rpm). After 30 minutes, the mixture was sorted by different sizes of sieves and the MWCNT coated PP were obtained. FIG. 10A is a perspective view showing the polymer body of PP/MWCNT composite obtained in the present disclosure, wherein the polymer body comprises a polymer pellet 210 made of PP and a coating layer 220 made of MWCNT formed on the polymer pellet 210.

Then, the coated PP pellets were placed between two aluminum plates with two Teflon mold release papers and a spacer (8 cm in diameter and 3 mm in thickness). This setup was placed in a press pre-heated to 200° C. under 10 MPa. After 10 minutes, the press was cooled naturally to room temperature and a PP/MWCNT nanocomposite preform with a honeycomb-like structure was obtained. For comparison, PP/MWCNTs was compounded by using a twin screw extruder (Leistriz Model 2570, L/D=40, D=27 mm). To have a sufficient mixing, the extruder was running with co-rotating screw configuration at relatively high rotation speed 60 rpm. The heating temperature was maintained at 200° C. Mechanical testing specimens of neat PP and compounded PP/MWCNT composites were prepared by compression molding (Carver 3853) at 200° C.

Figure 10B:
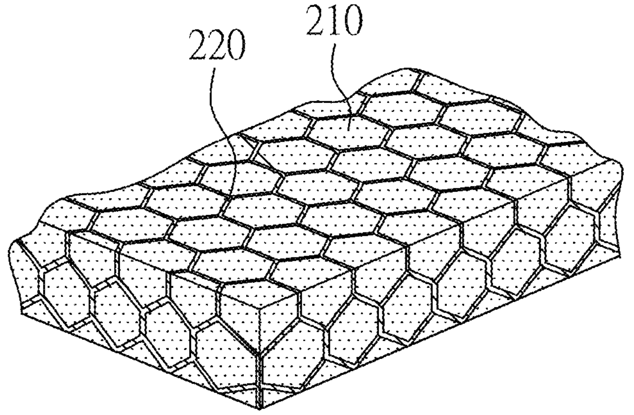
FIG. 10B is a perspective view showing a part of PP/MWCNT sheet after a PIF process according to Example 1 of the present disclosure.

The honeycomb PP/MWCNT nanocomposite preform was machined into a desired geometry, for example a 3 mm×12 mm×25 mm plate. Next, the sample was inserted into a mold cavity, for example a 12 mm×12 mm×100 mm cavity, and then the PIF process was performed. The mold was heated to a certain temperature, for example 110° C., and then an extremely high static pressure, for example 400 MPa, was applied on the mold and sample. The sample was induced to flow by the applied pressure. Except for the sample treated with PIF process, an ultrasound vibration machine of Branson 921 aes (Branson Ultrasonics Corp.) was utilized to explore the ultrasound vibration assisted PIF (UAPIF) process. The process was the same as in PIF except that an ultrasound vibration probe was applied to the sample. Under an applied pressure, for example 20.7 MPa, ultrasound vibration frequency, for example 20 khz, and ultrasound vibration time, for example 4 seconds, the sample was forced to deform or flow. All samples in both PIF and UAPIF processes were cooled naturally. After the PIF or UAPIF process, a PP/MWCNT sheet can be obtained, and the perspective view thereof is shown in FIG. 10B. As shown in FIGS. 10A and 10B, the polymer body, which comprises a polymer pellet 210 made of PP and a coating layer 220 made of MWCNT formed on the polymer pellet 210, are molded into a polymer sheet after the aforementioned PIF or UAPIF process; wherein the polymer sheet comprises plural polymer body shown in FIG. 10A interconnect to each other.

Figure 10C:
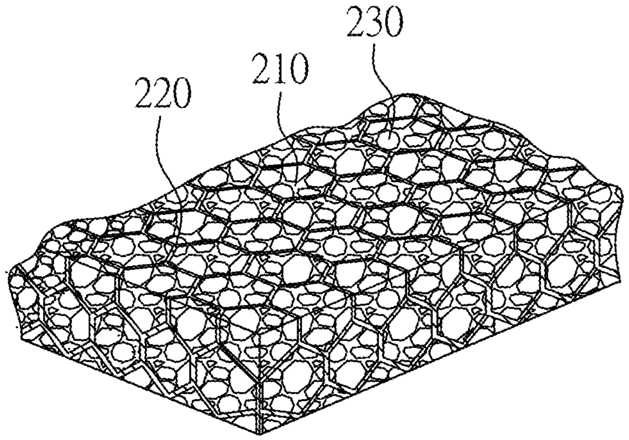
FIG. 10C is a perspective view showing a part of a PP/MWCNT foam after a foaming process according to Example 2 of the present disclosure.

Then, a batch foaming process was utilized to produce foams from PP and the PP/MWCNT composites before and after PIF or UAPIF. The PP nanocomposite was placed in a steel chamber which was pre-heated to the foaming temperature (130-160° C.). After temperature reached equilibrium, the chamber would be sealed and carbon dioxide gas under a pressure of 13.8 MPa was injected into the high pressure chamber by a syringe pump. The temperature and pressure was held for 2 hours for $CO_2$ diffusion, and the pressure was then released in 2-3 seconds to induce cell nucleation and foaming. After the foaming process, PP/MWCNT foam can be obtained, and the perspective view thereof is shown in FIG. 10C, in which cells 230 are formed in the polymer pellets 210.

For comparison, neat PP and compounded PP/MWCNT nanocomposites prepared by compression molding were also foamed using the same procedure. Hereinafter, the results of the present example are illustrated in detail.

"Brick and Mud" Structure

Figure 11A:
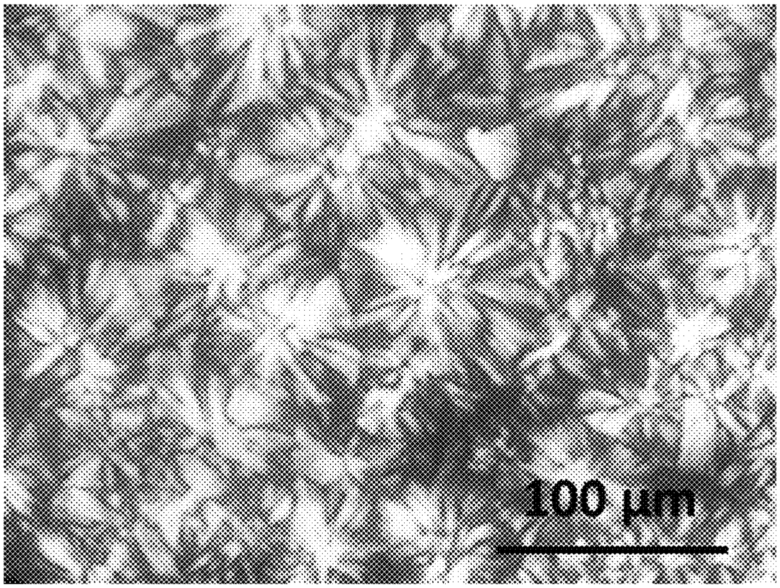
FIGS. 11A and 11B are respectively polarizing microscopy images of PP samples before and after treated by PIF according to Example 2 of the present disclosure.
Figure 11B:
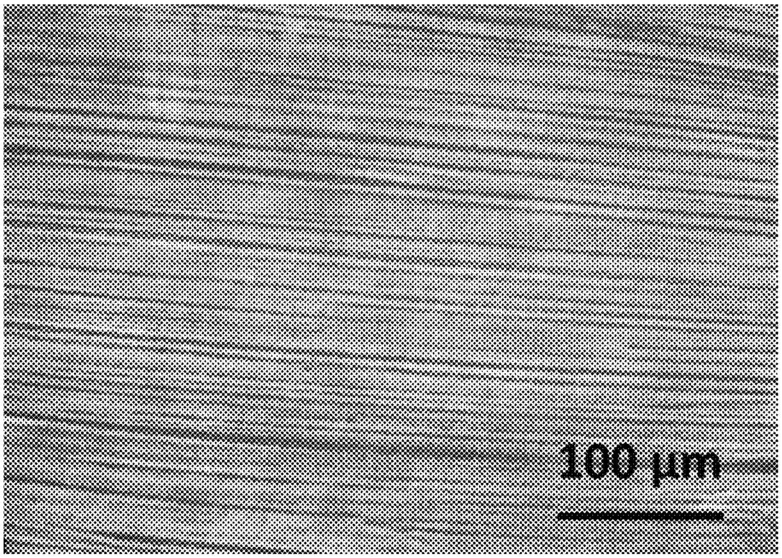

Unlike the typical spherulite structure, the PP sample forced to flow in the solid state under PIF led to crystal orientation along the PIF direction. From the polarizing microscopy (POM) images of PP samples before and after treated by PIF under 400 MPa and 110° C., the PP sample without PIF showed typical spherulites structure with size around 30-50 μm, as shown in FIG. 11A; and the crystal oriented along the PIF direction after being treated by PIF, as shown in FIG. 11B.

Figure 12A:
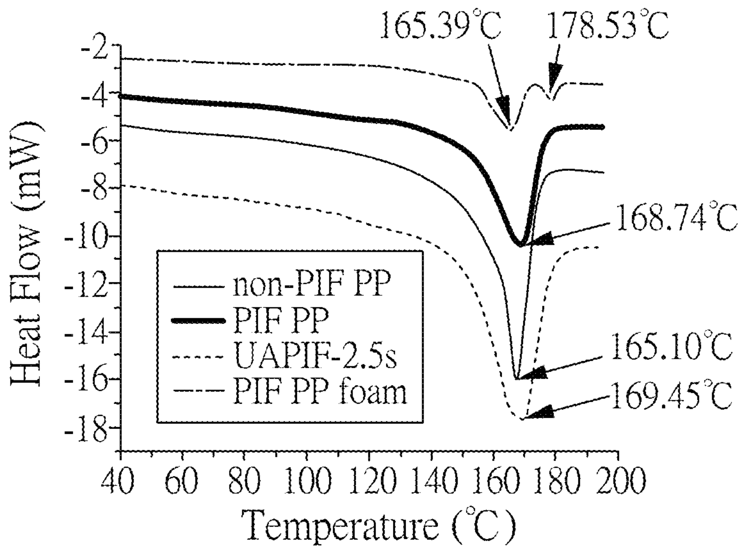
FIG. 12A are DSC curves of virgin PP, PIF PP, UAPIF PP and PIF PP foam obtained in Example 2 of the present disclosure.
Figure 12B:
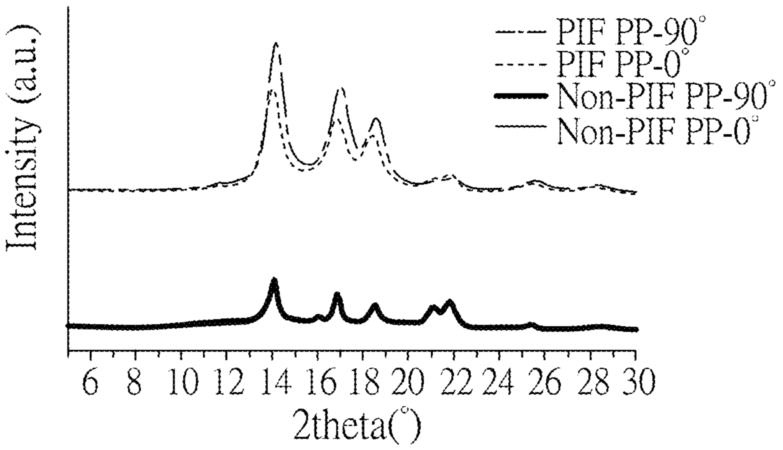
FIG. 12B are XRD of virgin PP and PIF PP obtained in Example 2 of the present disclosure.

In addition, the change of crystal structure by PIF was characterized by differential scanning calorimetry (DSC) and X-ray diffraction (XRD). Herein, PP, PIF PP (PIF condition: 110° C., 400 MPa), UAPIF PP (PIF condition: 110° C., 20.7 MPa) and PIF PP foam (Foaming condition: 13.8 MPa, 155° C.) were characterized. The DSC results in FIG. 12A show that the melting peak and the degree of crystallinity were slightly increased from 165.1 to 168.74° C. and from 30.2 to 32% respectively by PIF. The XRD spectrum in FIG. 12B (in which the curves of Non-PIF PP-0° and Non-PIF PP-90° are overlapped) shows the curves for non-PIF PP on the scanning angle of both 0° and 90° are nearly identical, indicating there is no preferred crystal lattice orientation in non-PIF PP. Difference could be identified in PP samples after PIF-processing (PIF condition: 110° C., 400 MPa), indicating an oriented crystal structure was produced in the materials during processing. This is a direct evidence of deformation of entire spherulites and involved lamellae. In general, the shape of spherulites changes from symmetrical to elongated along flow direction.

When the PP pellets were coated by MWCNT, the MWCNT coated layer would also flow along the PIF direction under high pressure. The MWCNT coated layer oriented along the PIF direction and a clear co-continuous "brick and mud" structure was formed. Here the structure consists of a macroscopic "brick and mud" structure of MWCNT coated layer as "brick" and PP resin within the coated layers as "mud"; and a microscopic "brick and mud"

structure of oriented PP crystals as "brick" and amorphous regions as "mud". Such unique dual "brick and mud" structure could provide superior mechanical and physical properties to conventional composites with the same composition, even the poor foamability of low melt strength PP could be greatly enhanced.

According to the results illustrated above, the application of high pressure could induce melt-like behavior in semi-crystalline polymers and block copolymer systems in solid state to form the "brick and mud" structure. When these materials are placed under pressure, the rigid plastic starts to dissolve into the soft region, creating a mixture that can flow like slurry of ice and water, which enables the material to be molded into a certain shape. When the pressure is released, the plastic re-hardens. The crystal structure in semi-crystalline polymers such as PP would also be deformed in this PIF process. The spherulites may undergo very large deformation, and the lamellae breaks into fraction and separates from each other in the equatorial region. While in the polar region, the lamellae are oriented parallel to the loading direction in a large-scale deformation.

Mechanical Properties

Figure 13A:
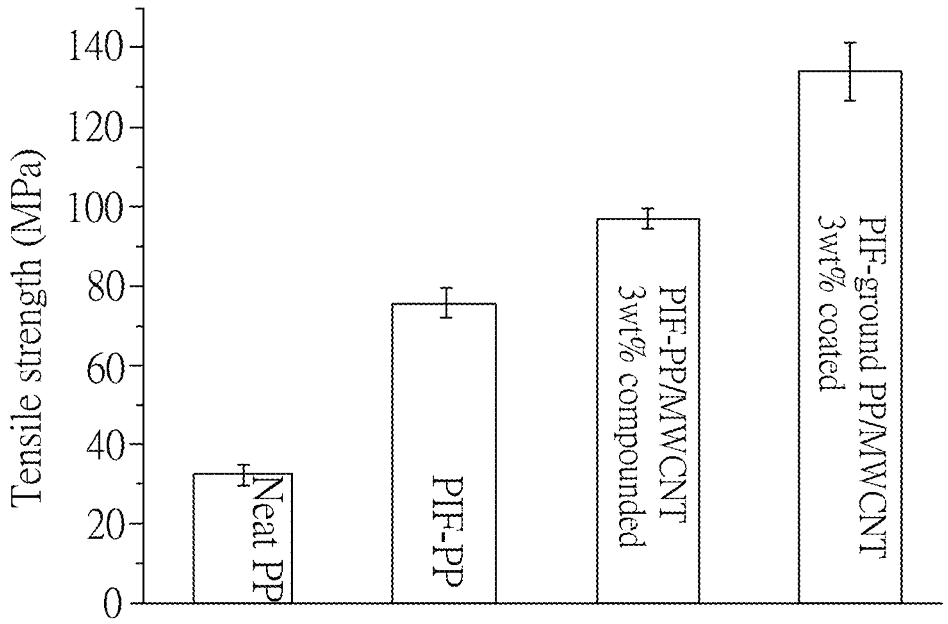
FIGS. 13A to 13C are respectively diagrams showing tensile, flexural and impact strength of PP and PP/MWCNT composite with and without PIF obtained in Example 2 of the present disclosure.
Figure 13B:
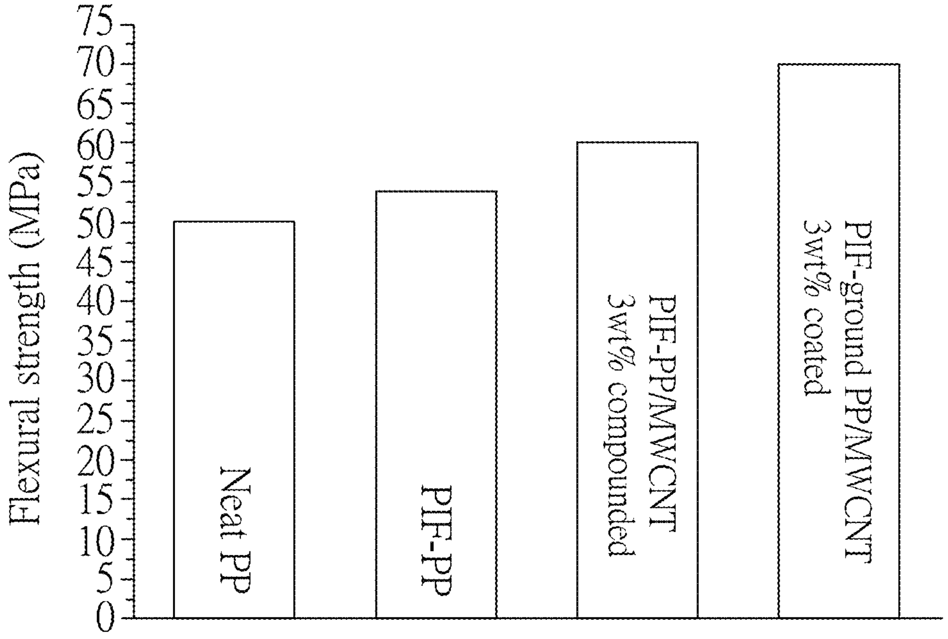
Figure 13C:
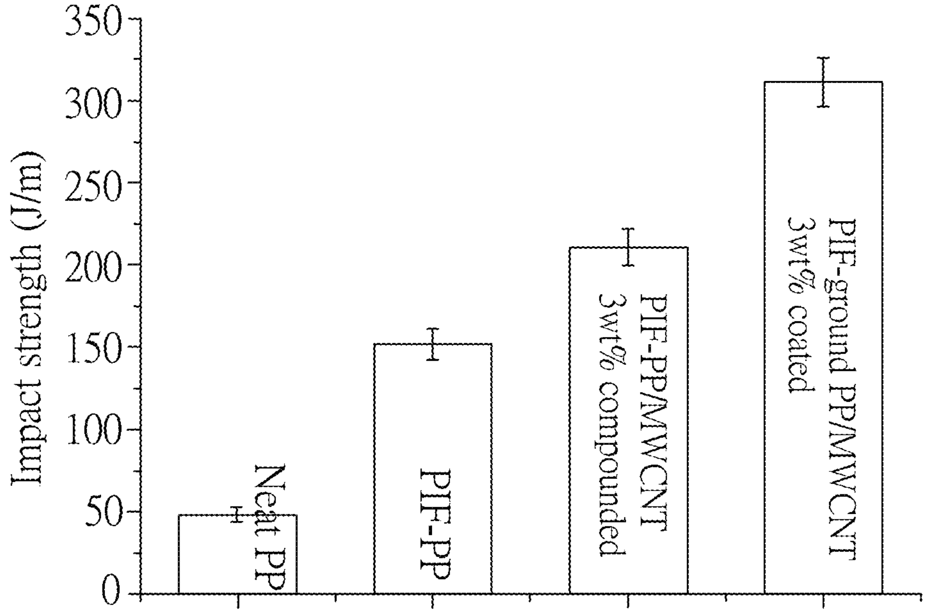

The strength of CNTs coated PP preform was very low (data not shown), but PIF was able to greatly increased its mechanical properties. FIG. 13A compares the tensile strength of PP and PP/MWCNT composites with and without PIF. The tensile strength increased >250% and >50% respectively by PIF when comparing with the neat PP and compounded PP/MWCNT samples prepared by compression molding. The tensile strength of the PIF prepared PP is also higher than that of the biaxial-oriented PP, which has a much higher strength than the injection molded PP. FIG. 13B compares the flexural strength of the same samples. Again, the PP/MWCNT nanocomposite with a "brick and mud" structure provided the best performance. Its flexural strength increased by >60% and >25% respectively for samples prepared by PIF when compared to the neat PP and compounded PP/MWCNT samples prepared by injection molding. Even larger difference was observed in Izod impact strength as shown in FIG. 13C. The PP/MWCNT nanocomposite with a "brick and mud" structure was 500% stronger than the neat PP sample and >40% better than compounded PP/MWCNT.

UAPIF led to similar improvement of the mechanical properties, but required a much lower pressure than in PIF. The required ultrasound conditions to achieve 200% deformation for different PP and PP/MWCNT samples are listed in the following Table 4, wherein the deformation of PP samples treated with the PIF process at 400 MPa and 110° C. was set as 200%.

TABLE 4

| Ultrasound pressure | Composition | Required time |
|---|---|---|
| 10.3 MPa | Neat PP | 3.5 s |
| | PP/MWCNT 3 wt % compounded | 4.0 s |
| | PP/MWCNT 1 wt % coated | 5.0 s |
| | PP/MWCNT 3 wt % coated | 6.0 s |
| 20.7 MPa | Neat PP | 2.5 s |
| | PP/MWCNT 3 wt % compounded | 2.5 s |
| | PP/MWCNT 1 wt % coated | 3.0 s |
| | PP/MWCNT 3 wt % coated | 3.5 s |
| 31 MPa | Neat PP | 2.0 s |
| | PP/MWCNT 3 wt % compounded | 2.0 s |
| | PP/MWCNT 1 wt % coated | 2.5 s |
| | PP/MWCNT 3 wt % coated | 3.0 s |

The results shown in Table 4 indicate that higher the ultrasound pressure, shorter the required ultrasound time. The required ultrasound time was only a few seconds. Compared with the conventional PIF process, the introduction of ultrasound vibration could effectively reduce the required pressure by at least one magnitude (from 400 MPa to 10-30 MPa). For PP/MWCNT nanocomposites, a longer processing time (more energy) was required to achieve the same level of deformation under an ultrasound pressure. Furthermore, the PP/MWCNT coated nanocomposites need a slightly longer time (more energy) than that for PP/MWCNT compounded ones.

Figure 14:
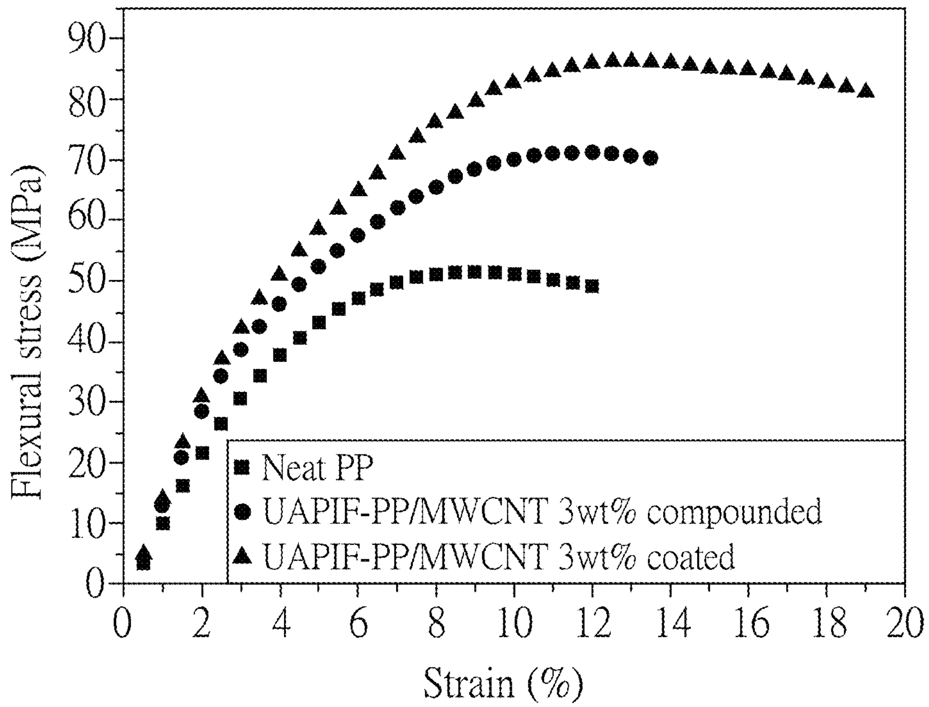
FIG. 14 is a diagram showing flexural properties of neat PP and UAPIF-PP/MWCNT composites obtained in Example 2 of the present disclosure.

FIG. 14 compares the flexural stress of neat PP, PP/MWCNT 3 wt % MWCNT compounded and coated samples after UAPIF. Like PIF, the UAPIF process could significantly enhance the flexural stress of PP samples. The PP/MWCNT 3 wt % nanocomposite with a "brick and mud" structure was >70% stronger than the neat PP sample and >25% better than 3 wt % compounded PP/MWCNT under UAPIF. The UAPIF process with a relative lower pressure is beneficial for manufacturing of large PP/MWCNT nanocomposite with substantially enhanced properties.

Figure 12C:
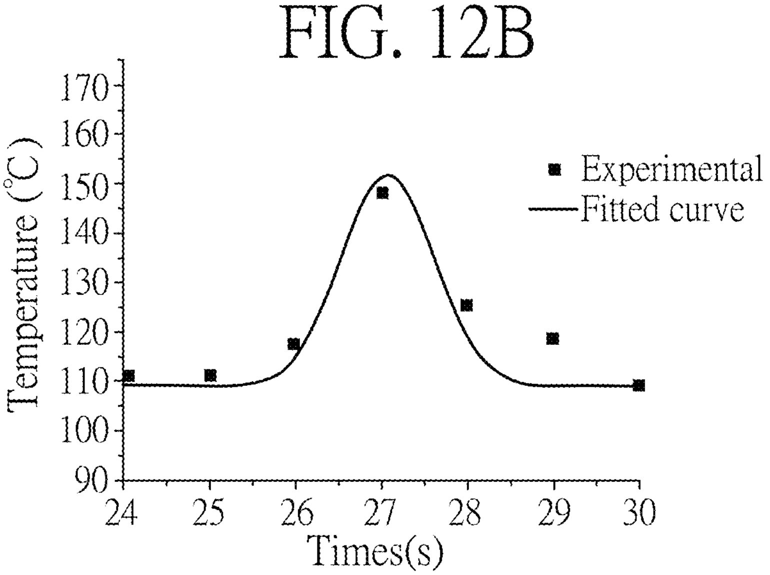
FIG. 12C is temperature rise in the UAPIF process.
Figure 19A:
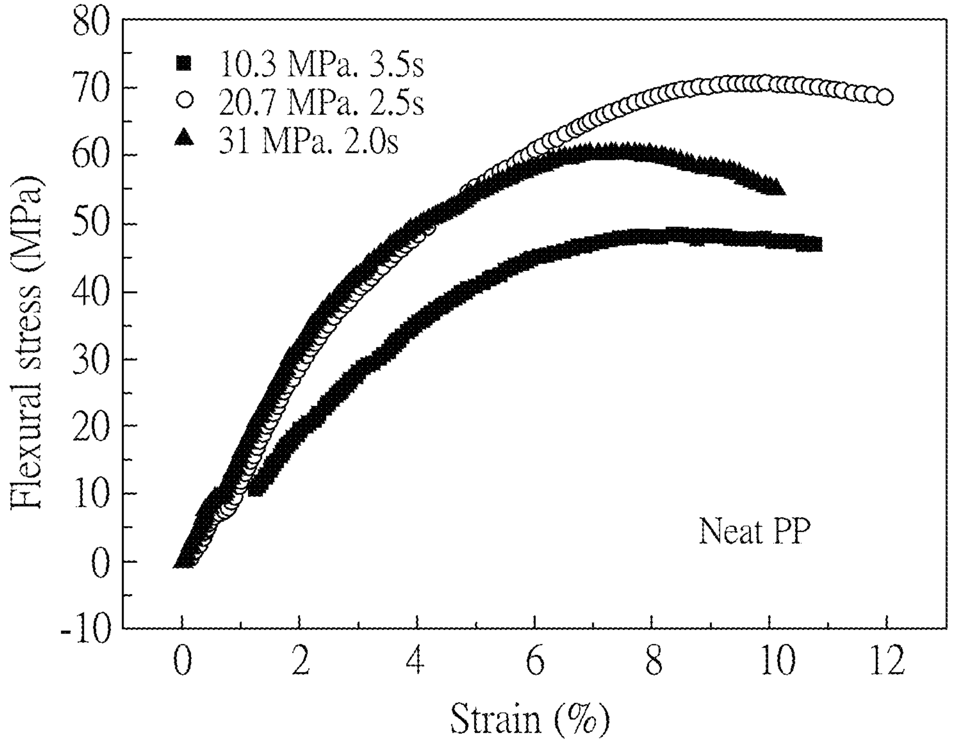
FIGS. 19A and 19B are diagrams showing flexural stress of neat PP and PP/MWCNT 3 wt % compounded after treated by UAPIF process in Example 2 of the present disclosure.
Figure 19B:
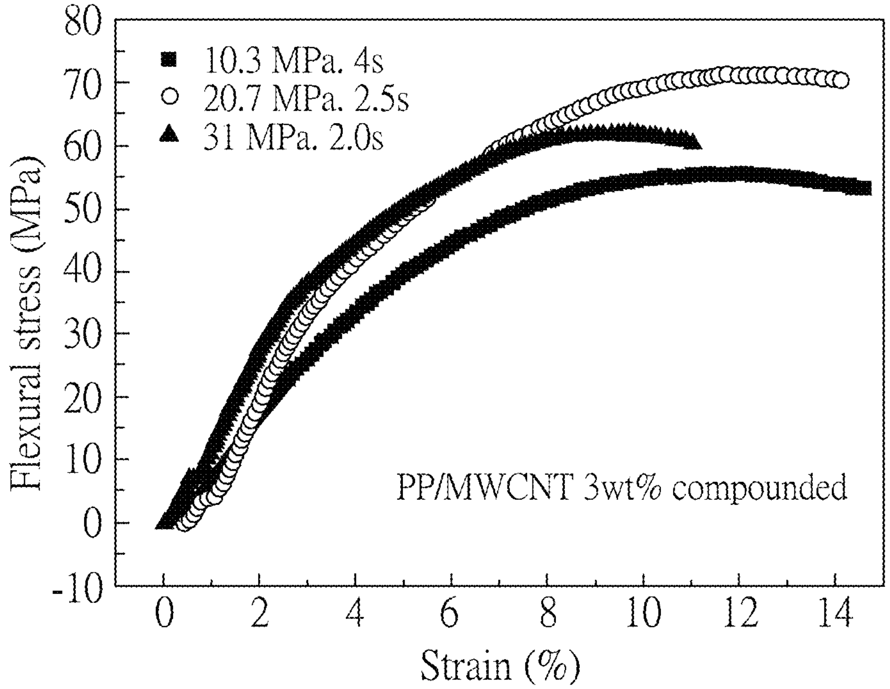

In addition, the temperature change in the PP sample under UAPIF was also measured herein, and the result is shown in FIG. 12C. Although ultrasound heated up the sample, the highest temperature was below the PP melting point when the mold temperature was set at 110° C., which means ultrasound won't melt the brick and mud structure. Furthermore, the results shown in FIG. 12A further confirmed that the melting temperature and the degree of crystallinity of UAPIF treated PP sample remained similar to those of PIF treated PP. However, if the mold temperature, molding pressure or ultrasound intensity was too high, melting could occur in the UAPIF process, which would reduce mechanical properties, as shown in FIGS. 19A and 19B. Therefore, it is important to select the optimal UAPIF conditions.

The exact mechanism on why ultrasound may substantially reduce the required PIF pressure remains unclear. Here we propose the following explanation. To form a "brick and mud" structure in solid state PIF, sufficient stress must be transferred from the rubbery amorphous phase to the rigid crystal domain and causing the latter to deform or orient. Under PIF, a very high static pressure is required to generate the sufficient stress because the crystal domains may slide against each other instead of being deformed or oriented. Under ultrasound assisted PIF, on the other hand, stress propagation through the rubbery amorphous phase could be more efficient with less crystal domain sliding, which leads to the need of a much lower PIF pressure.

The aforementioned results indicate ultrasound can reduce the required pressure in the PIF process. However, even though the ultrasound is not introduced into the PIF process, the crystal domain of the PP or the PP/MWCNT composite still can be deformed and turned into the "brick and mud" structure.

Like PP, the compounded PP/MWCNT sample with 3 wt % nanoparticle loading was not conductive. While the MWCNT coated PP samples were electrically conductive due to the formation of a "brick and mud" co-continuous structure. PP with 3 wt % MWCNT coating had an electrical resistance of ~0.55 kΩ. UAPIF slightly increased the electrical resistance to 0.9 kΩ. In the compounded PP/MWCNT composites, sufficient MWCNTs are needed to reach the percolation threshold of electrical conductivity. Due to difficult nanoparticle dispersion in PP, 3 wt % MWCNT was apparently not enough to achieve the percolation threshold.

On the other hand, the honeycomb like co-continuous structure in the PIF and UAPIF prepared PP/MWCNT composites could make the samples with 3 wt % MWCNT electrically conductive because MWCNTs were interconnected with each other to form conductive tunnels via the entire sample.

Foamability of PP/MWCNT "Brick and Mud" Structure Composites

Figure 18A:
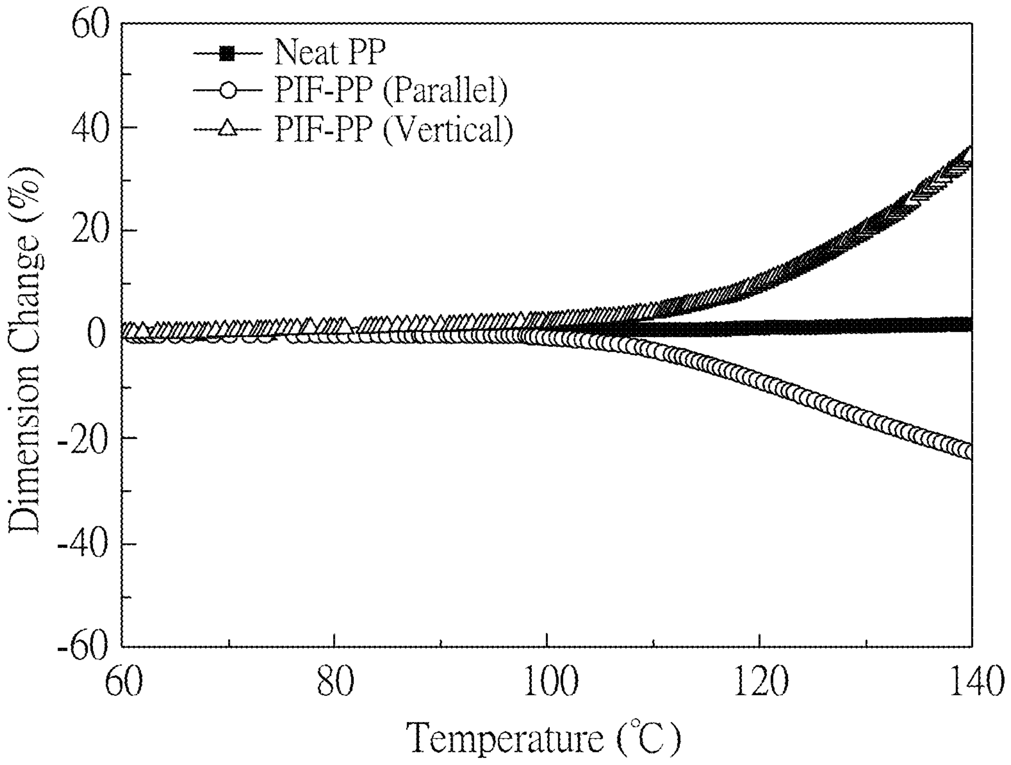
FIGS. 18A and 18B are diagrams showing TMA curves of neat PP and PIF PP in Example 2 of the present disclosure.
Figure 18B:
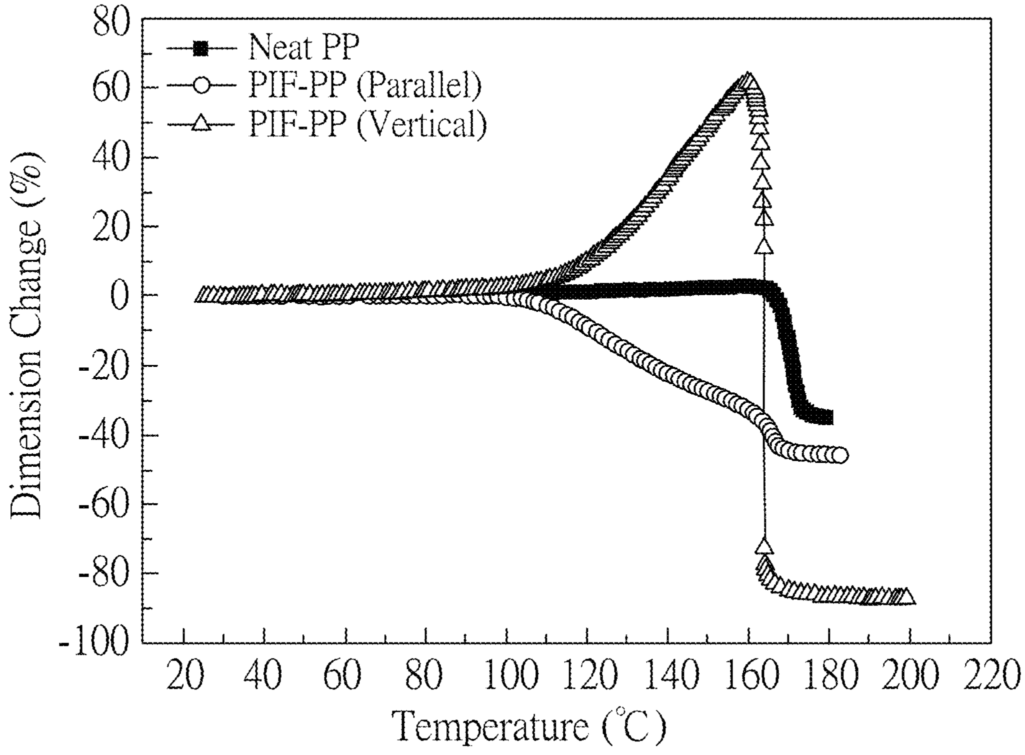

A major drawback of PIF and UAPIF formed samples is the high residual stresses. As shown in FIGS. 18A and 18B, the elongated PP would shrink in the flow direction and expand in the perpendicular direction under thermal treatment, resulting in severe sample warpage. However, this sample warpage does not influence the foamability of polymer foam greatly.

A solid-state batch foaming process using supercritical carbon dioxide ($scCO_2$) was carried out to prepare PP composite foam from the "brick and mud" structure. $CO_2$ has been utilized as a physical foaming agent in many foaming applications to replace the ozone depleting fluorine-based foaming agents because of its many favorable properties (i.e. non-flammable, non-toxic, inexpensive, and relatively high solubility in polymers).

The residual stresses could be fully released under solid state foaming. In addition, a unique layer-by-layer bimodal cell structure with microcellular cell sizes formed at 150° C. and 13.8 MPa $CO_2$ pressure was observed (data not shown). In comparison, there are only a few cells formed in the neat PP and PP with 3 wt % compounded MWCNT. The resulting foams had density in the range of 0.65-0.86 g/cm$^3$ with samples treated by PIF at a lower density as shown in the following Table 5.

TABLE 5

| Sample | Foam density (g/cm$^3$) |
|---|---|
| Neat PP | 0.76 |
| PP/MWCNT 3 wt % compounded | 0.86 |
| Ground PP/MWCNT 3 wt % coated | 0.77 |
| PIF-PP | 0.66 |
| PIF-PP/MWCNT 3 wt % compounded | 0.65 |
| PIF-ground PP/MWCNT 3 wt % coated | 0.66 |

Figure 15:
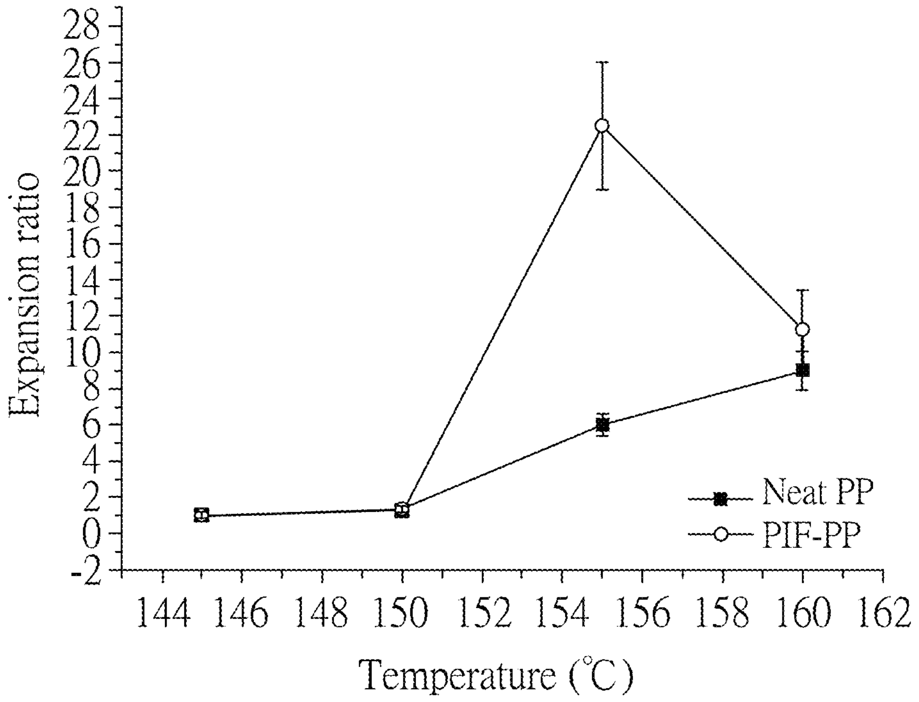
FIG. 15 is a diagram showing expansion ratio of neat PP foam and PIF PP foam obtained in Example 2 of the present disclosure.
Figure 16:
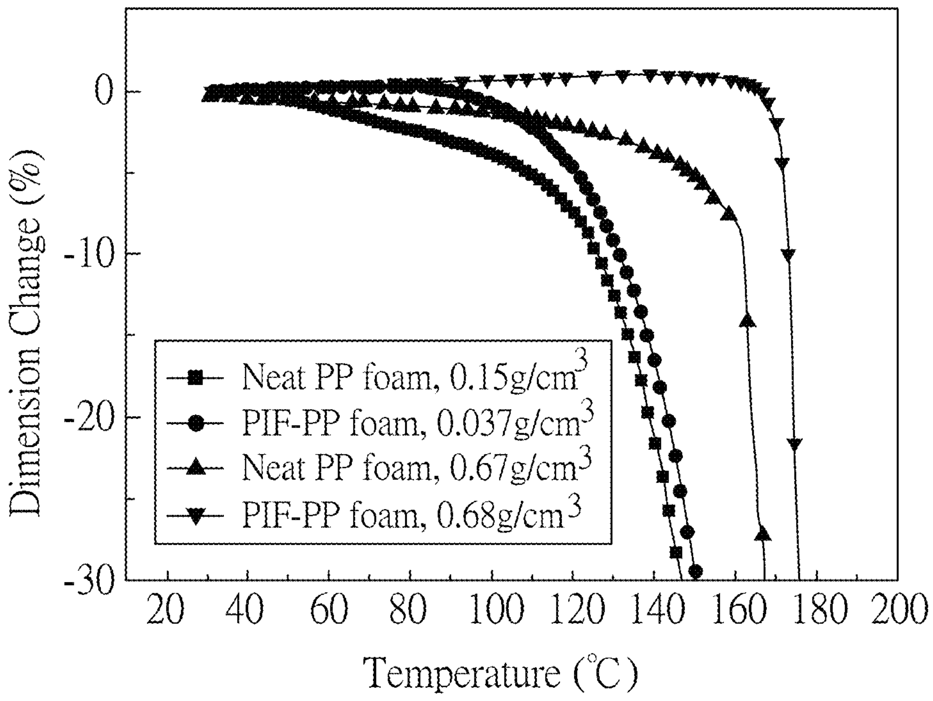
FIG. 16 is a thermal mechanical analysis (TMA) curve of neat PP and PIF-PP foams.

Due to the low melt strength of PP, it is difficult to achieve foams with a uniform cell structure and low bulk density; but the "brick and mud" structure generated by PIF may overcome these limitations. As shown in FIG. 15, the foam obtained from neat PP had a much lower expansion ratio (6) than that of PIF-PP samples (22.5) at 155° C. and 13.8 MPa $CO_2$ pressure. In addition, from SEM (data not shown), a low-density (0.039 g/mL) PIF-PP/MWCNT 3 wt % coated nanocomposite foam prepared by free expansion under 13.9 MPa $CO_2$ pressure at 155° C. has a layer-by-layer bimodal foam structure. Foaming at 155° C. did cause the changes of the crystal structure after foaming. The degree of crystallinity decreased from 32 to 18.3% and there was β-cylindrites formation. Interestingly, the solid state foaming on PIF prepared PP was able to enhance its thermal stability as shown in FIG. 16.

In a solid-state batch foaming process, the crystalline structure would affect both cell nucleation and growth. In the cell nucleation step, the interface between lamellar and amorphous domains is a high-energy region where the Gibbs free energy necessary for nucleating a stable cell is less than that for homogeneous nucleation, resulting in the preferential nucleation of cells at the interface. While in the cell growth step, the formed cells is constrained by the neighboring lamellar because of less mobility of molecule chains in crystalline regions. When the foaming temperature was higher than 155° C., the melting temperature of $CO_2$ saturated PP, the difference in the expansion ratio between neat PP and PIF-PP diminished as shown in FIG. 15 because of the melting of the "brick and mud" structure.

Figure 17A:
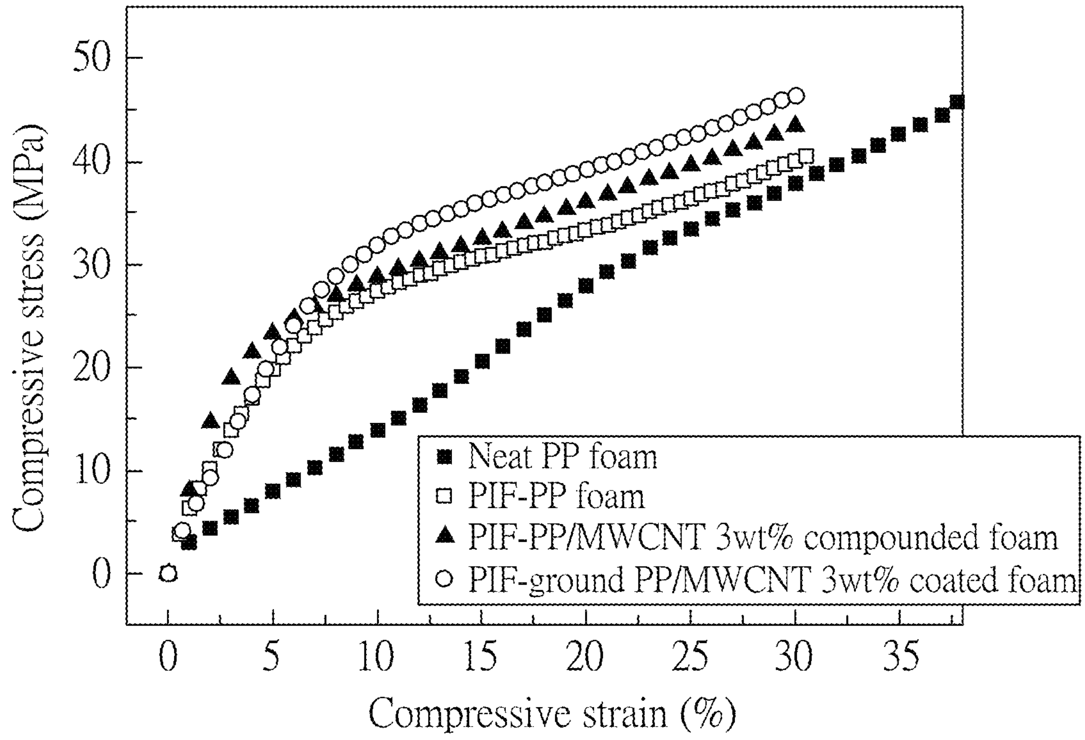
FIGS. 17A and 17B respectively show compressive stress vs. strain curves of high-density and low-density PP foams derived from neat PP and PP/MWCNT nanocomposite foams with and without PIF.

The compressive stress vs. strain of both solid neat PP and PP foams derived from different PP/MWCNT composites are illustrated in FIG. 17A. Take 10% compressive strain as an example, the compressive strength of a foam from neat PP (density 0.76 g/cm$^3$) was only around 10 MPa, which was ~25% of that of the solid PP (density 0.9 g/cm$^3$). However, the compressive strength of PIF-PP foam with a lower density of 0.66 g/cm$^3$ reached up to 25 MPa, while the compressive strength of the PIF processed PP/MWCNT coated nanocomposite foam with a similar density was getting closer to that of solid PP.

The difference of foam density between PP/MWCNT composites with or without PIF was larger at a higher foaming temperature of 155° C. with 13.9 MPa $CO_2$ pressure, as shown in the following Table 6. The neat PP foam had a density of >0.15 g/cm$^3$, while samples prepared by PIF with and without MWCNT nanoparticles, had a density around 0.037-0.04 g/cm$^3$. The foam samples with 3 wt % compounded and coated MWCNT without PIF had a similar density as the neat PP foam without PIF (0.18-0.24 g/cm$^3$), indicating that the "brick and mud" structure, not the nanoparticles, is the main factor controlling the expansion ratio. The "brick and mud" structure could prevent $CO_2$ from diffusion out of samples, and help support the formed cells from collapse.

TABLE 6

| | Foam density, g/cm$^3$ | Cell structure | Average cell size, μm | |
|---|---|---|---|---|
| Neat PP | 0.15 | Single-modal | 385 | |
| PIF-PP | 0.037 | Layer by layer Bi-modal | Big: 135 | Small: 38 |
| PIF-grinded PP/MWCNT 3 wt % coated | 0.040 | Layer by layer Bi-modal | Big: 112 | Small: 45 |
| PP/MWCNT 3 wt % compounded | 0.18 | Single-modal | 178 | |

Figure 17B:
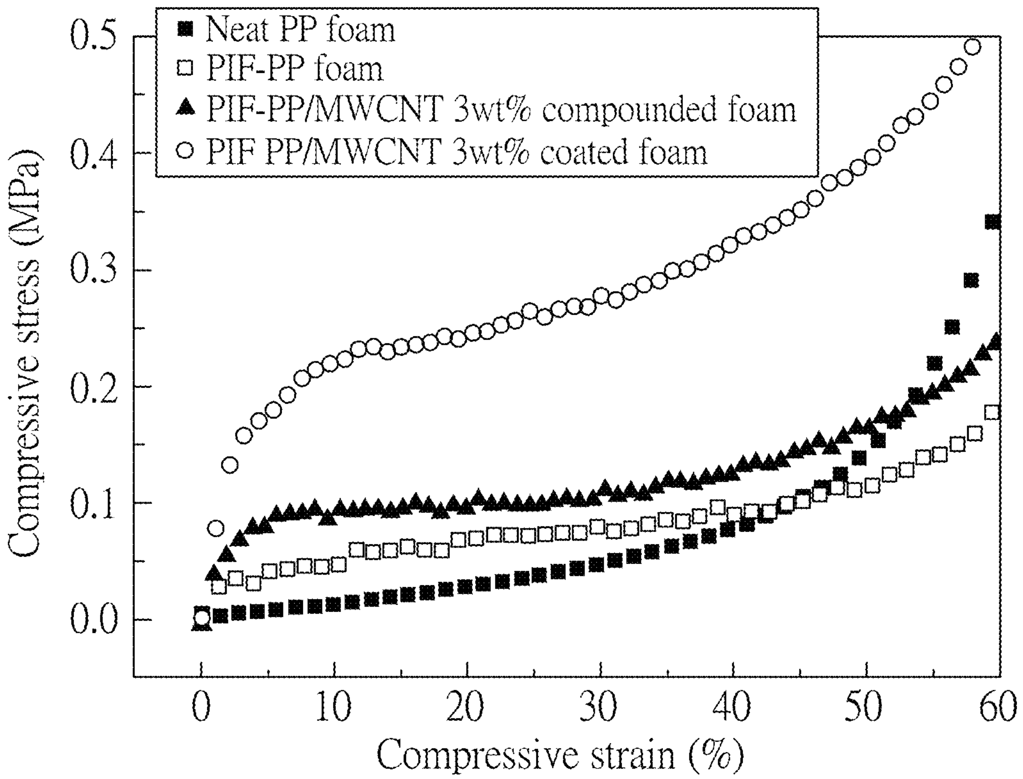

FIG. 17B compares compressive stress vs. strain of low-density neat PP and PP/MWCNT nanocomposite foams with and without PIF. Densities of those foams prepared at 155° C. are: neat PP: 0.15 g/cc, PIF-PP: 0.037 g/cc, PIF-PP/MWCNT 3 wt % coated: 0.04 g/cc, and PIF-PP/MWCNT 3 wt % compounded: 0.04 g/cc. Although the density of the neat PP foam was 2.5-2.7 times higher than that of the rest foam samples with a "brick and mud" structure, the compressive stress of this PP foam was the lowest. Clearly, the "brick and mud" structure, which leads to a smaller and closed cell structure, contributed greatly to this significant performance enhancement. Under PIF, foams containing coated MWCNT provided much better compressive properties than the compounded sample, probably due to its layer-by-layer bimodal cell structure.

In summary, PP/MWCNT nanocomposites with a "brick and mud" structure were fabricated by coating MWCNT on small PP pellets, and then going through the PIF or UAPIF process. The UAPIF process may decrease the required PIF pressure with comparable morphology and properties, but the ultrasonic is not necessarily required in the method of the present disclosure. In addition, this "brick and mud" structure obtained after the PIF or UAPIF process also enhanced the foamability of low melt strength PP and produced low density foams without any physical or chemical additives. With the coated MWCNT, the "brick and mud" structure led to foams with a layer-by-layer bimodal cell structure. Such foams provided superior mechanical properties and better thermal stability than conventional foams with the same composition, and are electrically conductive.

In conclusion, from the results shown in Examples 1 and 2, it can be found that the PIF process with or without ultrasonic assistance is a critical process for preparing the polymer foam, because the PIF polymer sheet has the ability to keep $CO_2$ and prevent $CO_2$ from escaping out the PIF polymer sheet fast; and therefore, polymer foam with low density can be obtained under a shorter foaming time.

Although the present disclosure has been explained in relation to its preferred embodiment, it is to be understood that many other possible modifications and variations can be made without departing from the spirit and scope of the invention as hereinafter claimed.

What is claimed is:

1. A method for preparing polymer foam, comprising the following steps:

providing a polymer body of an unmodified polymer or a polymer composite with the unmodified polymer, wherein the unmodified polymer is polypropylene;

performing a pressure-induced flow (PIF) process on the polymer body at a first predetermined temperature and a first predetermined pressure for a pressure holding time, to obtain a polymer sheet; and performing a foaming process on the polymer sheet by using a foaming agent at a second predetermined temperature and a second predetermined pressure for a saturation time, to obtain polymer foam, wherein the second predetermined temperature is in a range from 150° C. to 160° C. and the second predetermined pressure is in a range from 15.5 MPa to 20 MPa.

2. The method of claim 1, wherein the first determined temperature is lower than a melting point of the polymer body.

3. The method claim 1, wherein the first predetermined temperature is in a range from 100° C. to 160° C.

4. The method of claim 1, wherein the first predetermined pressure is in a range from 20 MPa to 420 MPa.

5. The method of claim 1, wherein the pressure holding time is in a range from 10 sec to 300 sec.

6. The method of claim 1, wherein the second predetermined pressure is in a range from 15.5 MPa to 17.3 MPa.

7. The method of claim 1, wherein the polymer body is semi-crystalline thermoplastics or thermoplastic elastomers.

8. The method of claim 1, wherein the foaming agent is pentane, isopentane, cyclopentane, CO2, N2, a nitrogen-based material or a combination thereof.

9. The method of claim 8, wherein the foaming agent is supercritical CO2.

10. The method of claim 1, wherein the polymer body is a composite containing polymer pellets and coating materials, and surfaces of the polymer pellets are coated with the coating materials.

11. The method of claim 10, wherein the composite is prepared by the following steps:

providing and mixing the polymer pellets and the coating materials to obtain a mixture; and heating the mixture to obtain the composite.

12. The method of claim 10, wherein the polymer pellets and the coating materials are mixed at a temperature in a range from 140° C. to 160° C.

13. The method of claim 11, wherein the mixture is heated at a temperature in a range from 100° C. to 300° C.

14. The method of claim 11, wherein the mixture is heated at a pressure in a range from 11.7 MPa to 17.3 MPa.

15. The method of claim 10, wherein the coating material is an organic substance, an inorganic substance or a combination thereof.

16. The method of claim 15, wherein the coating material is at least one selected from the group consisting of carbon nanotubes, graphene, graphene oxide, carbon black, carbon nanofibers, graphite, carbon microparticles, clay, mica, glass fibers, silicates, metal particles, SiO2, MgO, CaO, talc, TiO2, ZnO and MnO.

17. The method of claim 1, wherein the PIF process is an ultrasound assisted PIF process.

18. The method of claim 1, wherein the saturation time is in a range from 10 min to 120 min.

19. The method of claim 1, wherein the polypropylene is linear polypropylene.

20. The method of claim 1, wherein after the PIF process, the polymer body is turned into a co-continuous brick and mud structure.

* * * * *